(12) United States Patent
Enomoto

(10) Patent No.: US 7,164,540 B2
(45) Date of Patent: Jan. 16, 2007

(54) ZOOM LENS SYSTEM

(75) Inventor: Takashi Enomoto, Chiba (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 11/081,497

(22) Filed: Mar. 17, 2005

(65) Prior Publication Data

US 2005/0207025 A1     Sep. 22, 2005

(30) Foreign Application Priority Data

Mar. 18, 2004    (JP) .............................. 2004-079042

(51) Int. Cl.
G02B 15/14    (2006.01)
(52) U.S. Cl. ................... 359/686; 359/689; 359/676
(58) Field of Classification Search ................ 359/676, 359/686, 689, 679, 685
See application file for complete search history.

(56) References Cited

U.S. PATENT DOCUMENTS

| | | | |
|---|---|---|---|
| 5,572,277 A * | 11/1996 | Uzawa et al. ............... 359/686 |
| 5,587,841 A | 12/1996 | Ito | |
| 5,793,533 A | 8/1998 | Yoneyama et al. | |
| 5,793,535 A | 8/1998 | Ito et al. | |
| 5,969,880 A | 10/1999 | Hasushita et al. | |
| 6,369,955 B1 | 4/2002 | Enomoto et al. | |
| 6,437,922 B1 | 8/2002 | Enomoto et al. | |
| 6,829,100 B1 | 12/2004 | Enomoto | |
| 2003/0231405 A1 | 12/2003 | Enomoto | |
| 2004/0105165 A1 | 6/2004 | Enomoto | |
| 2005/0088755 A1 | 4/2005 | Enomoto | |

FOREIGN PATENT DOCUMENTS

| | | |
|---|---|---|
| JP | 6-194573 | 7/1994 |
| JP | 9-120028 | 5/1997 |
| JP | 10-268191 | 10/1998 |

OTHER PUBLICATIONS

English language Abstract of JP 6-194573.
English language Abstract of JP 9-120028.
English language Abstract of JP 10-268191.

* cited by examiner

Primary Examiner—Scott J. Sugarman
Assistant Examiner—Darryl J. Collins
(74) Attorney, Agent, or Firm—Greenblum & Bernstein, P.L.C.

(57) ABSTRACT

A zoom lens system includes 'n' ($n \geq 3$) lens groups. A first lens group that is the most object-side lens group of said zoom lens system has a positive refractive power, and a final lens group that is the most image-side lens group of the zoom lens system has a negative refractive power. The distance from the most object-side surface of the positive first lens group to the most image-side surface of the negative final lens group becomes shortest at an intermediate focal length between the short focal length extremity and the long focal length extremity.

30 Claims, 15 Drawing Sheets

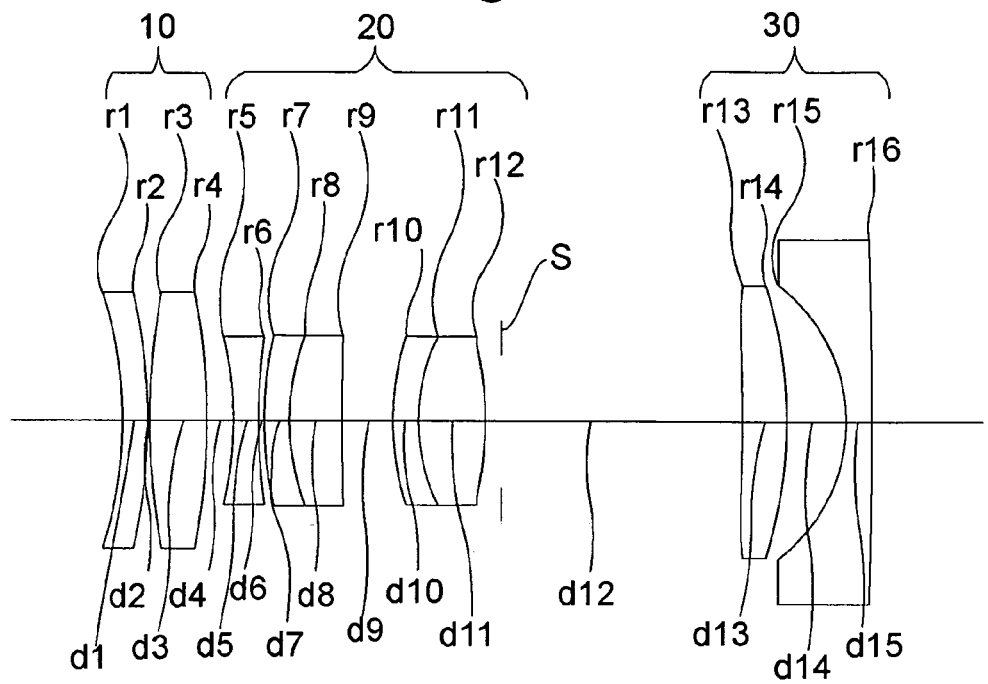

FNo.=1:6.5

—— d Line
······ g Line
---- C Line

-1.0  1.0
SPHERICAL
ABERRATION

CHROMATIC
ABERRATION

W=22.8°

-0.05  0.05
LATERAL
CHROMATIC
ABERRATION

W=22.8°

—— S
-- M

-1.0  1.0
ASTIGMATISM

W=22.8°

-5.0(%)5.0
DISTORTION

FNo.=1:13.2

—— d Line
······ g Line
---- C Line

-1.0  1.0
SPHERICAL
ABERRATION

CHROMATIC
ABERRATION

W=8.9°

-0.05  0.05
LATERAL
CHROMATIC
ABERRATION

W=8.9°

—— S
-- M

-1.0  1.0
ASTIGMATISM

W=8.9°

-5.0(%)5.0
DISTORTION

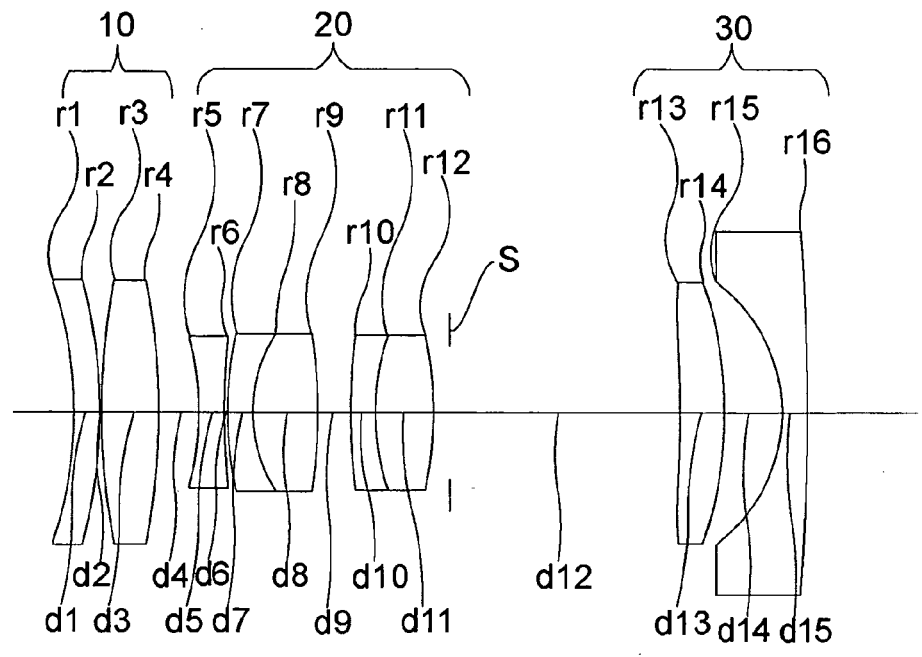

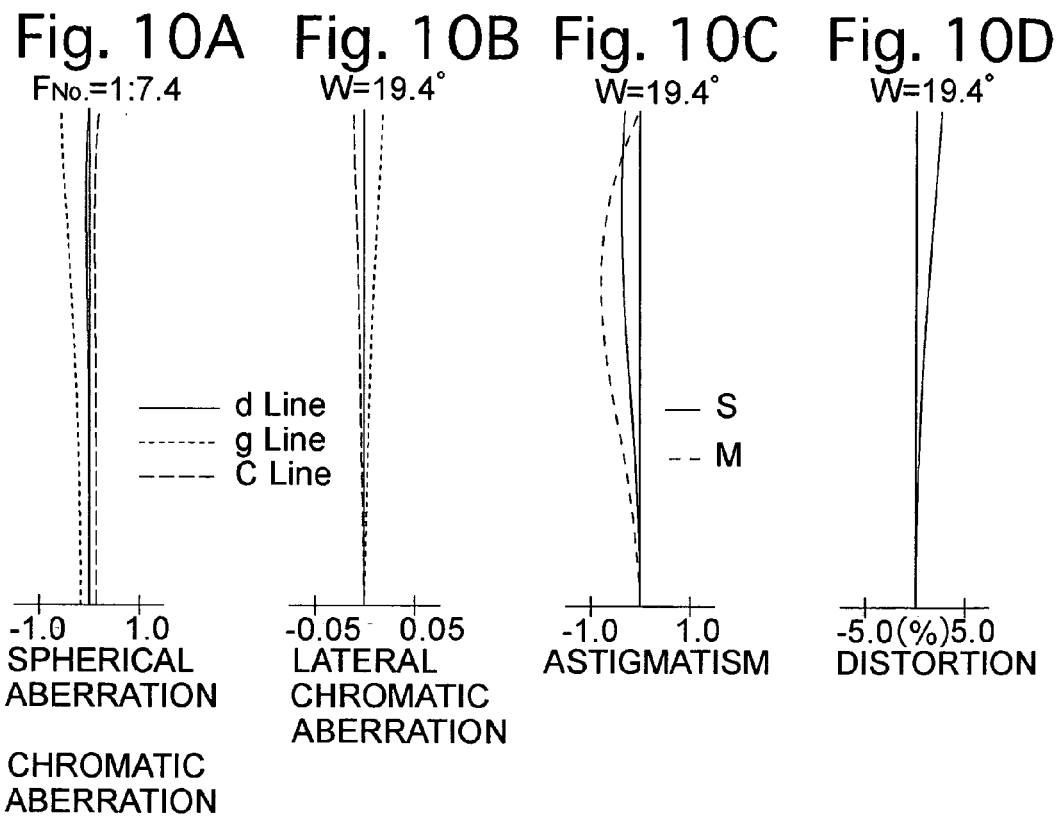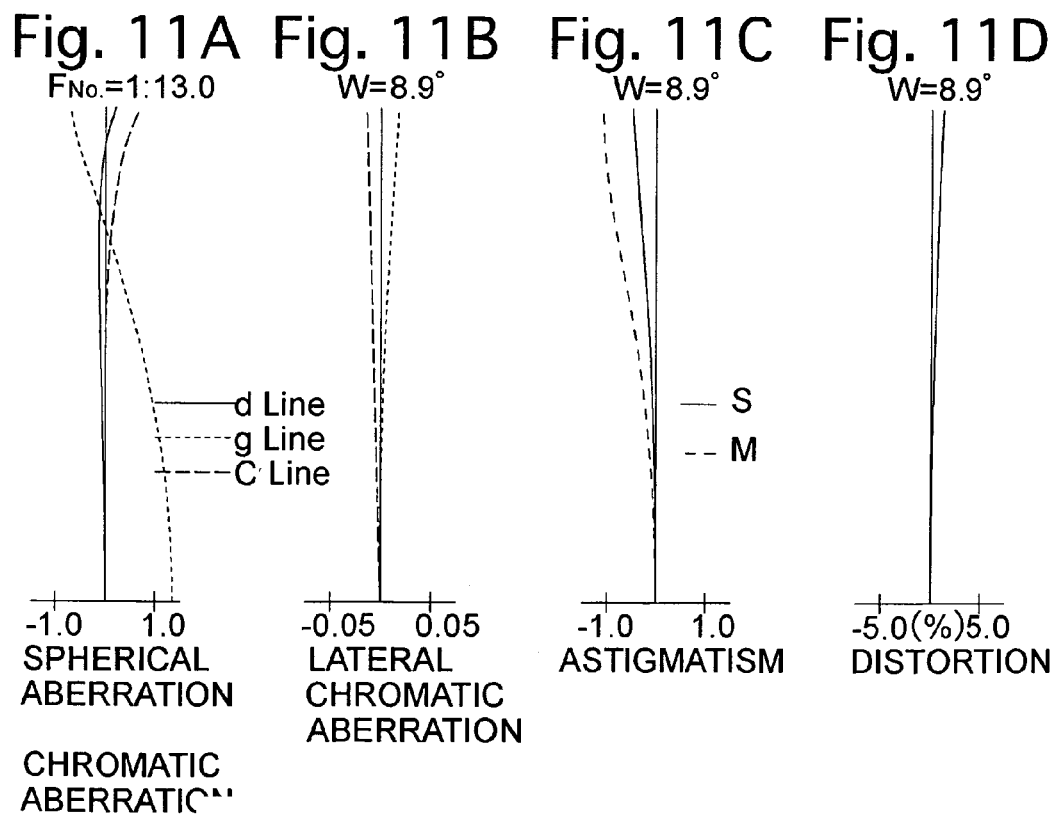

Fig. 12
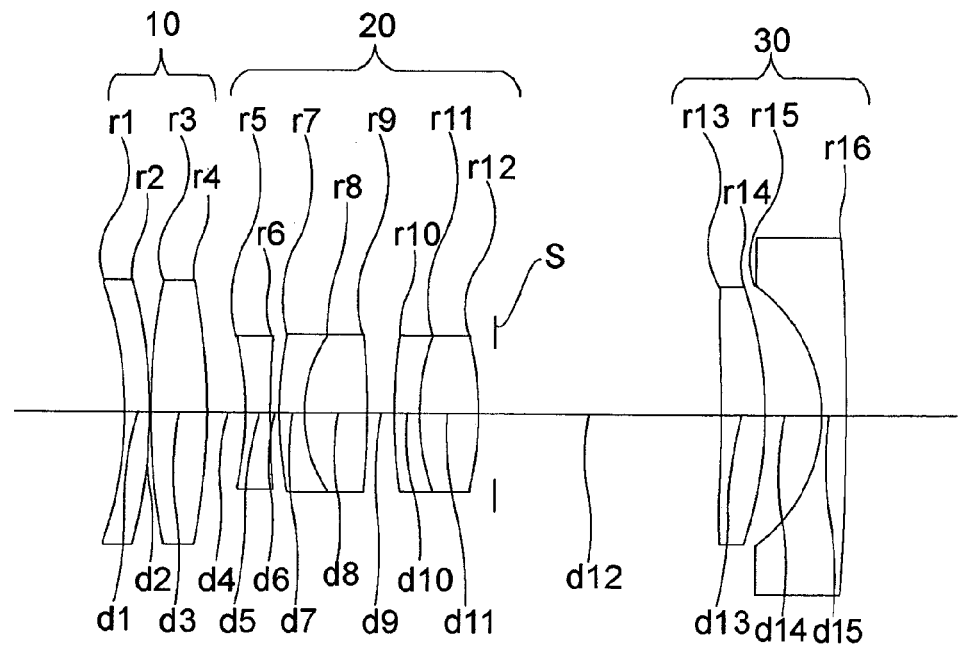
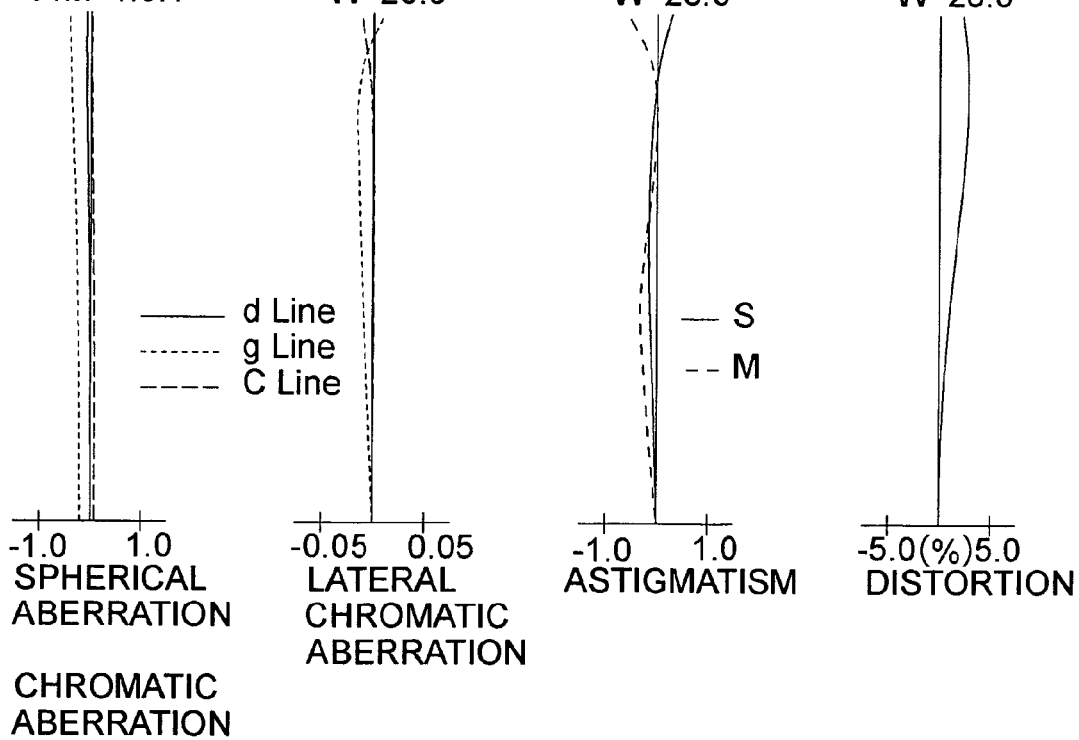
Fig. 13A  Fig. 13B  Fig. 13C  Fig. 13D

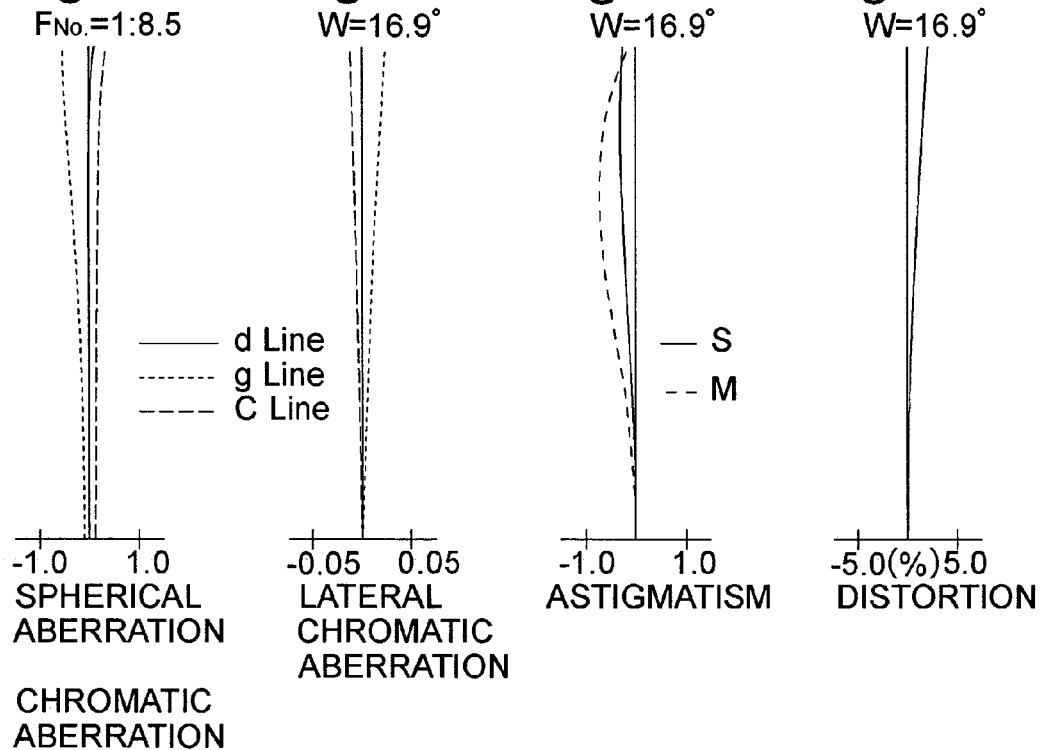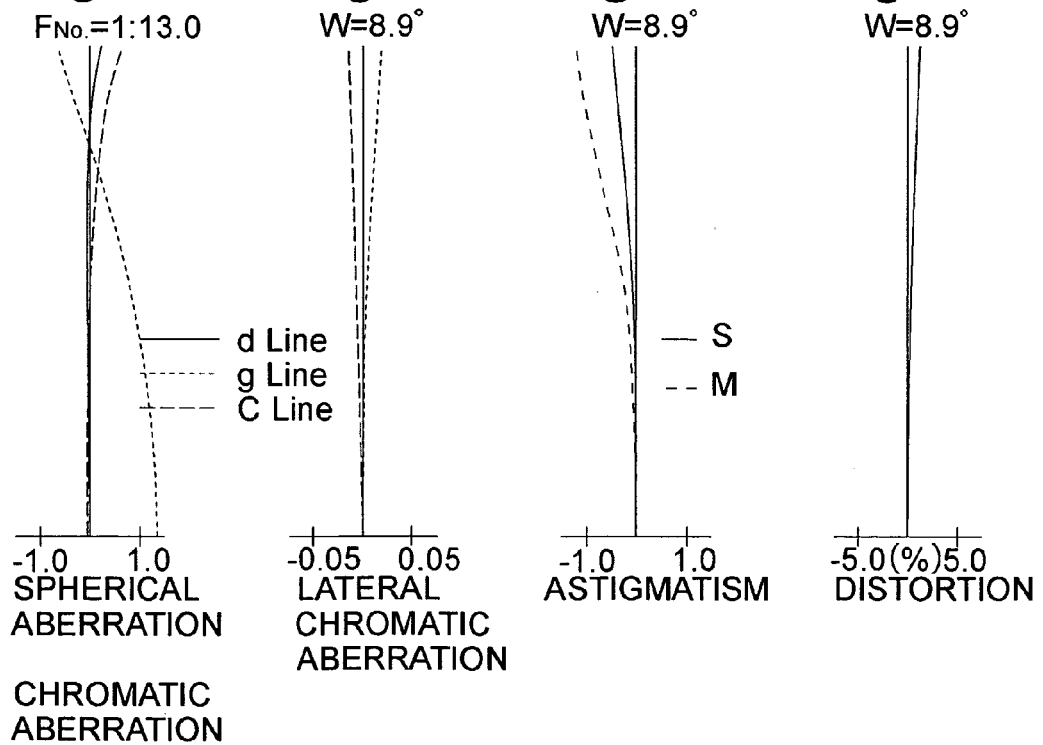

Fig. 16
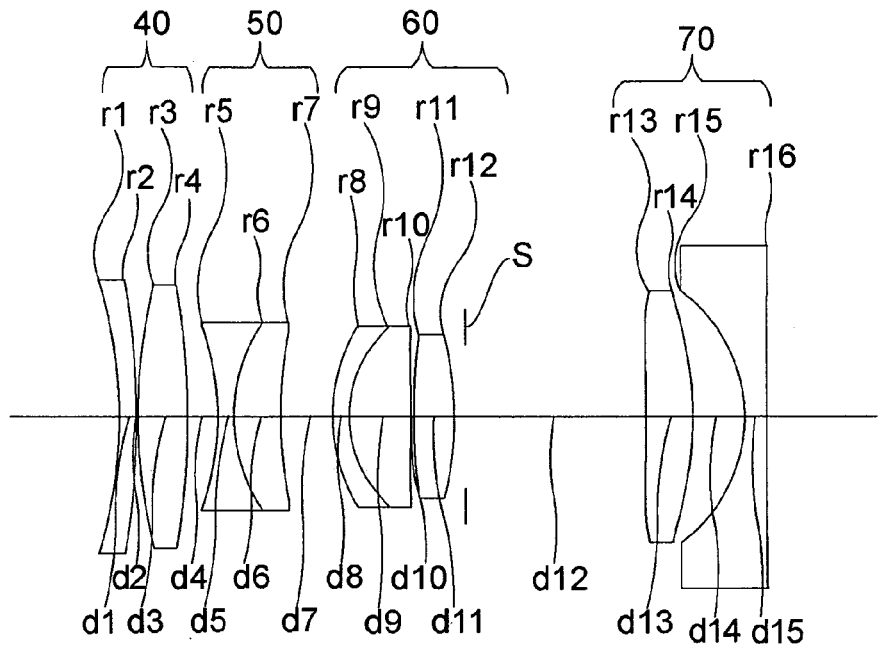
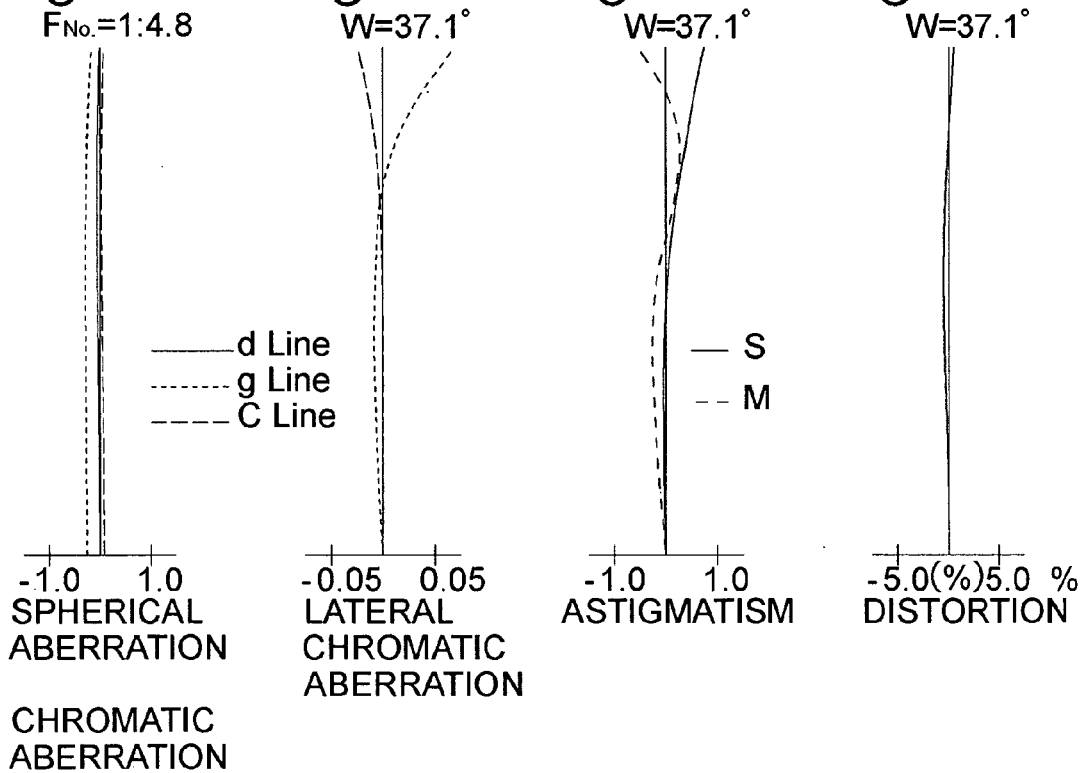
Fig. 17A  Fig. 17B  Fig. 17C  Fig. 17D

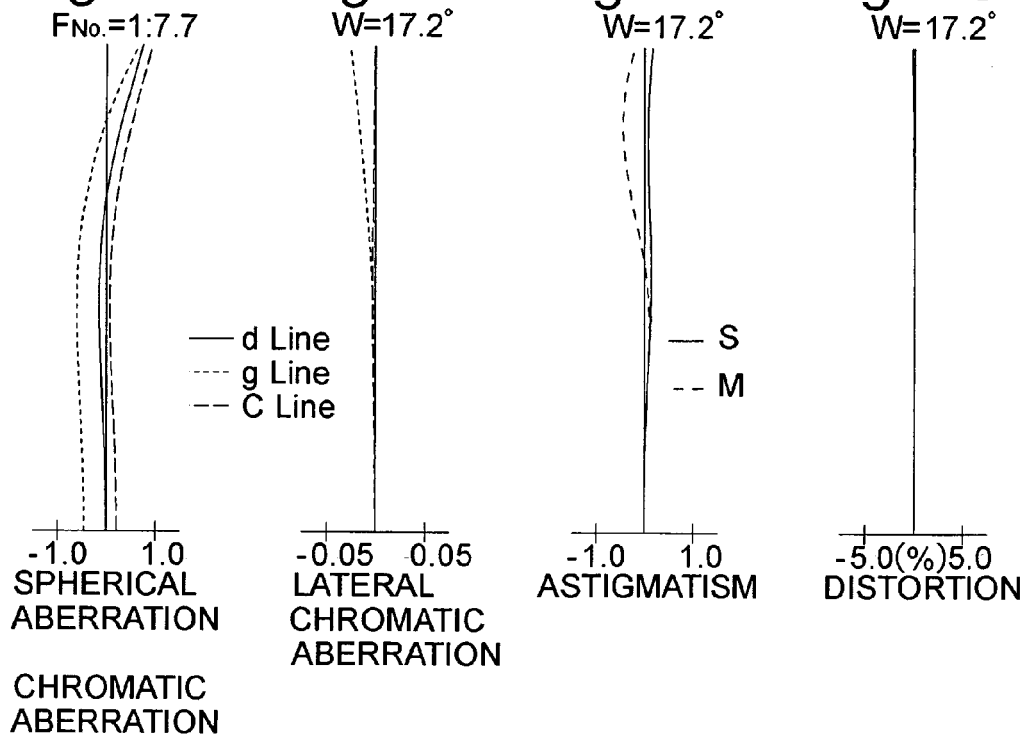
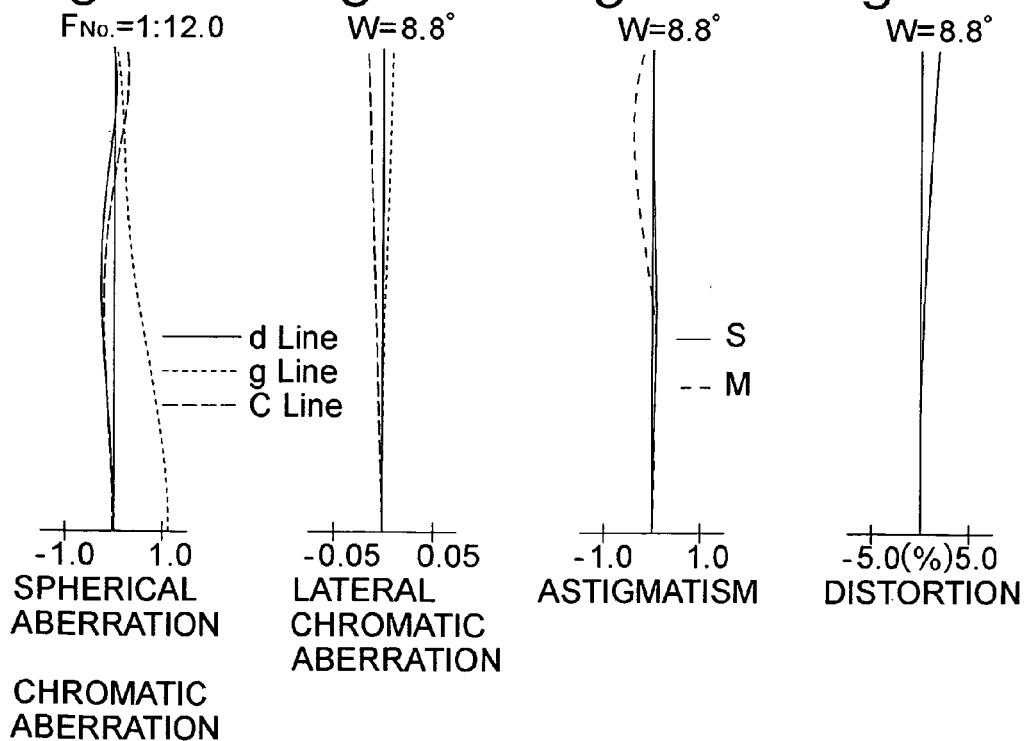

Fig. 20
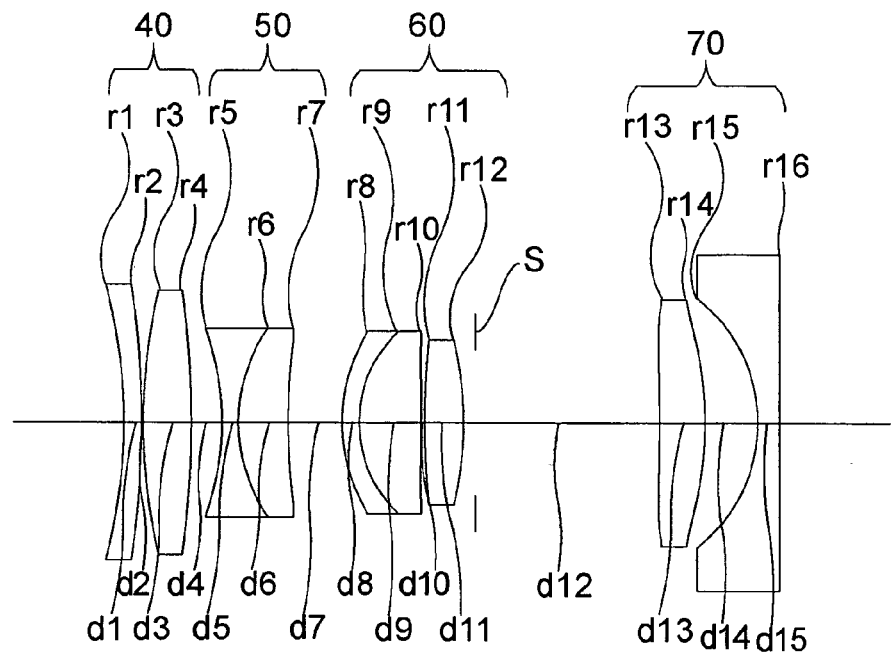
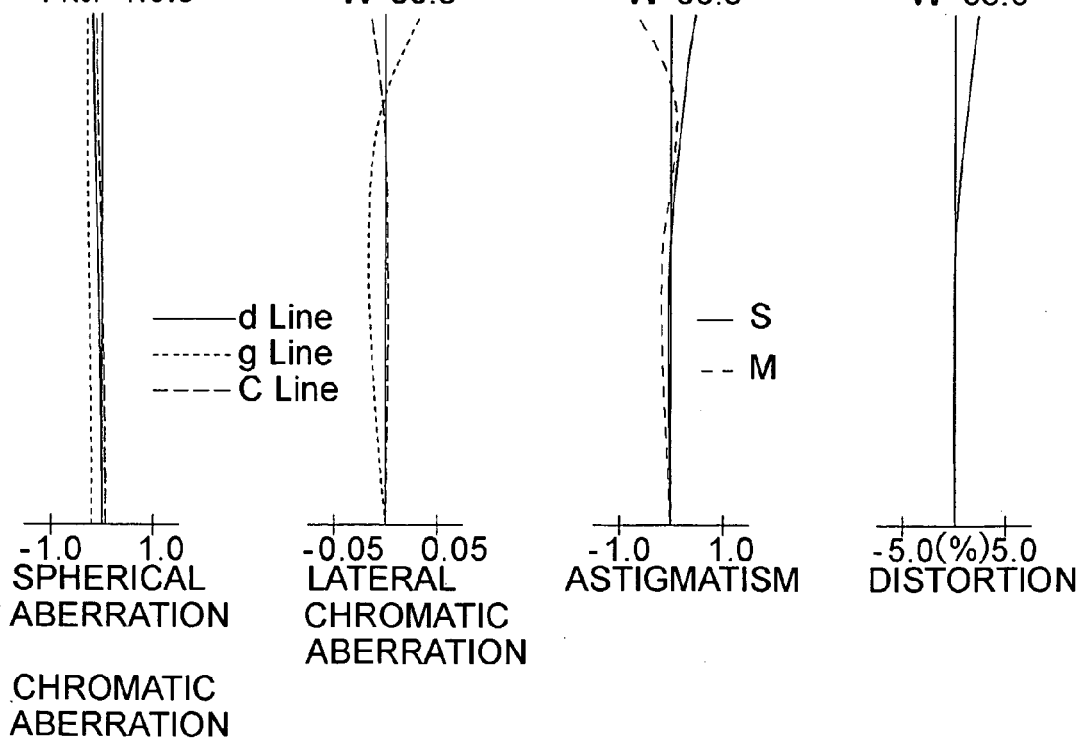

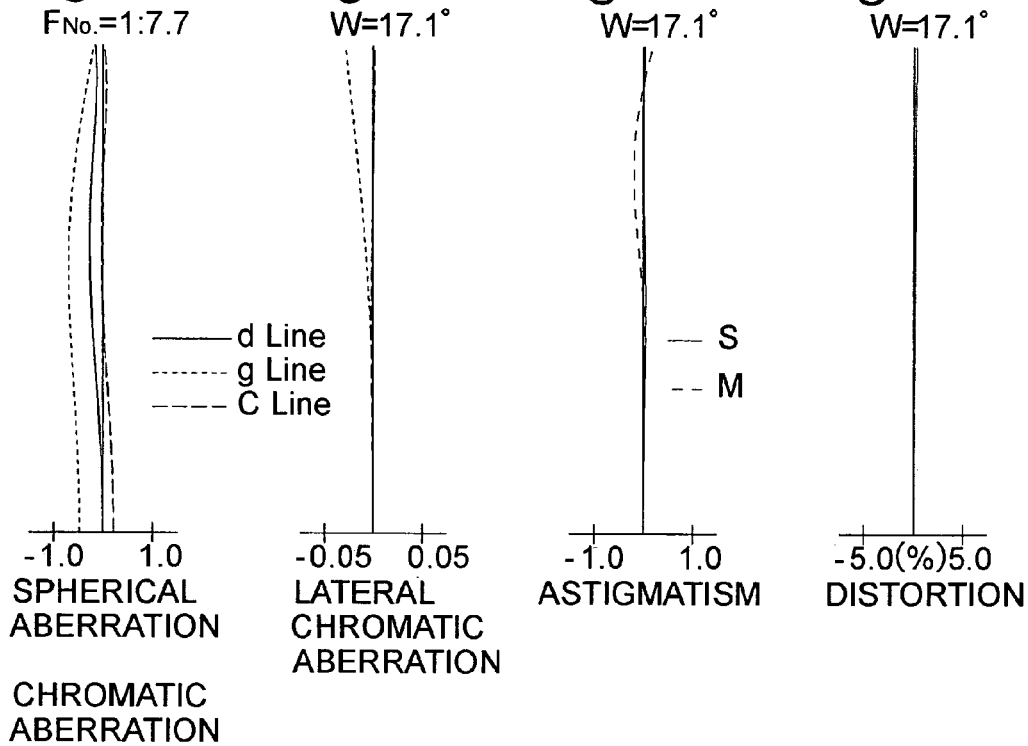
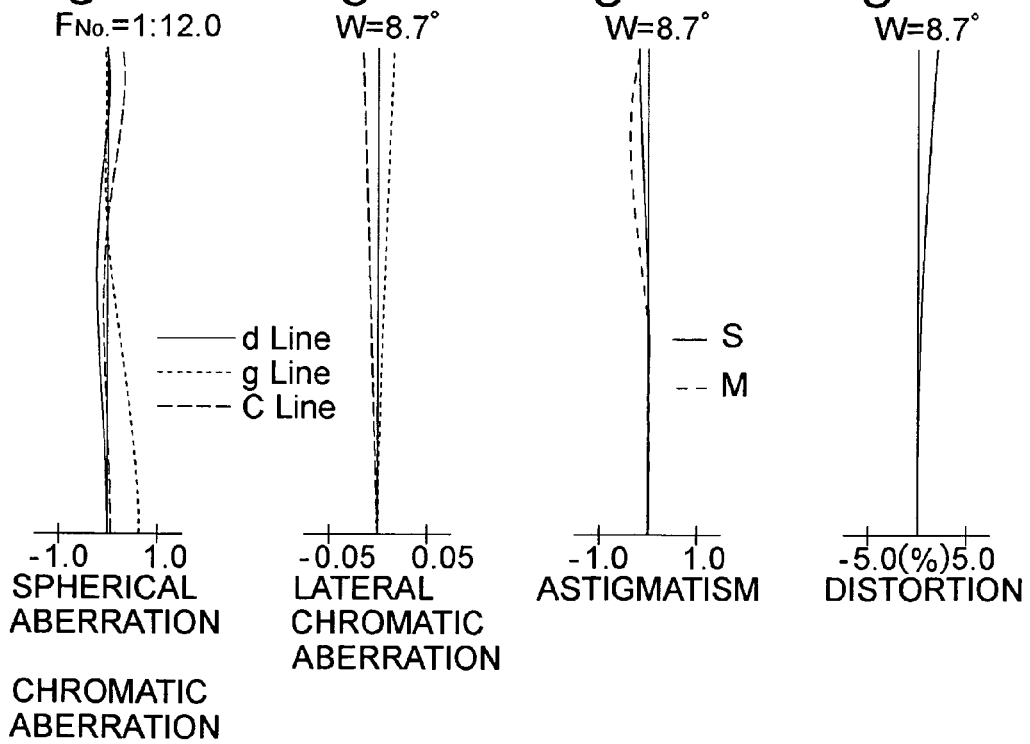

Fig. 24
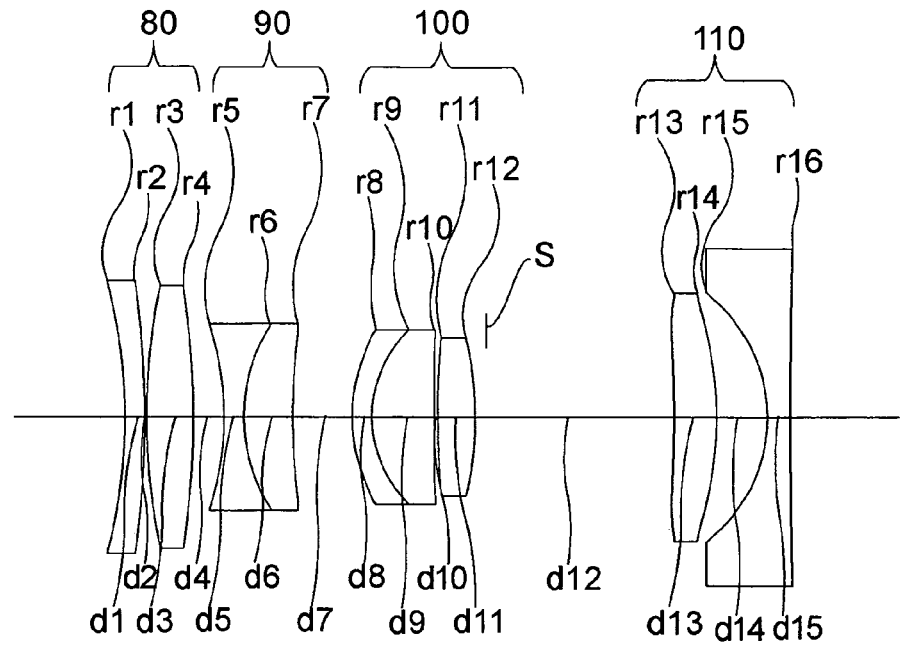
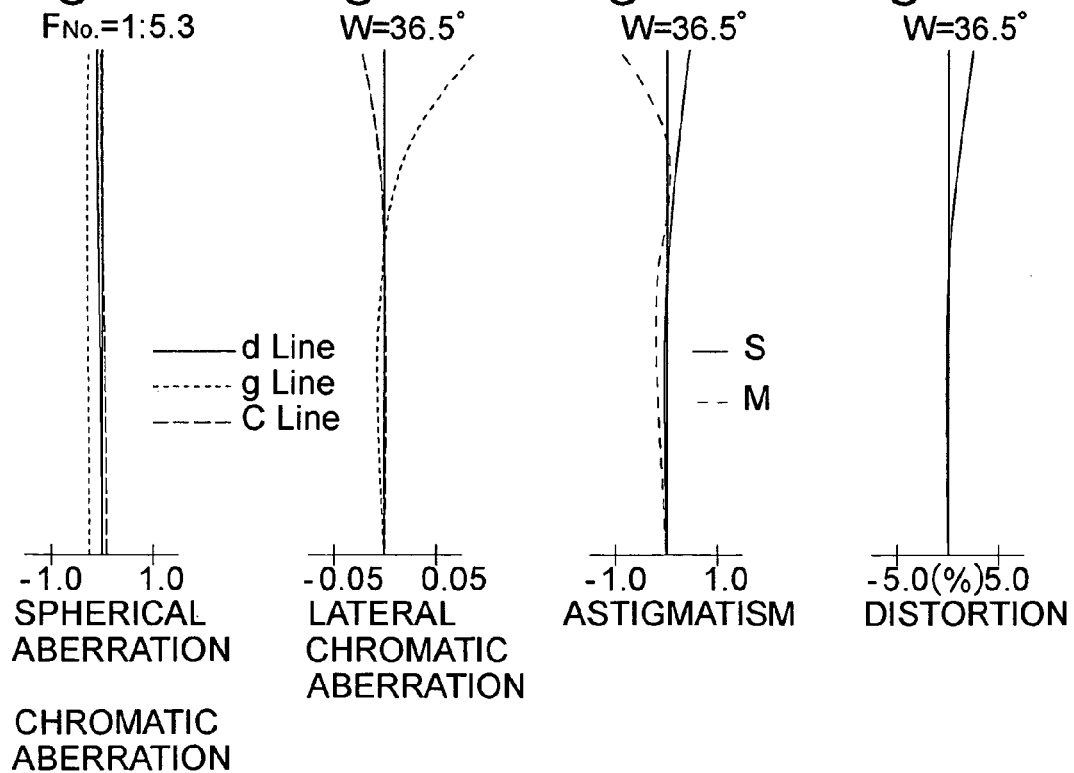
Fig. 25A  Fig. 25B  Fig. 25C  Fig. 25D

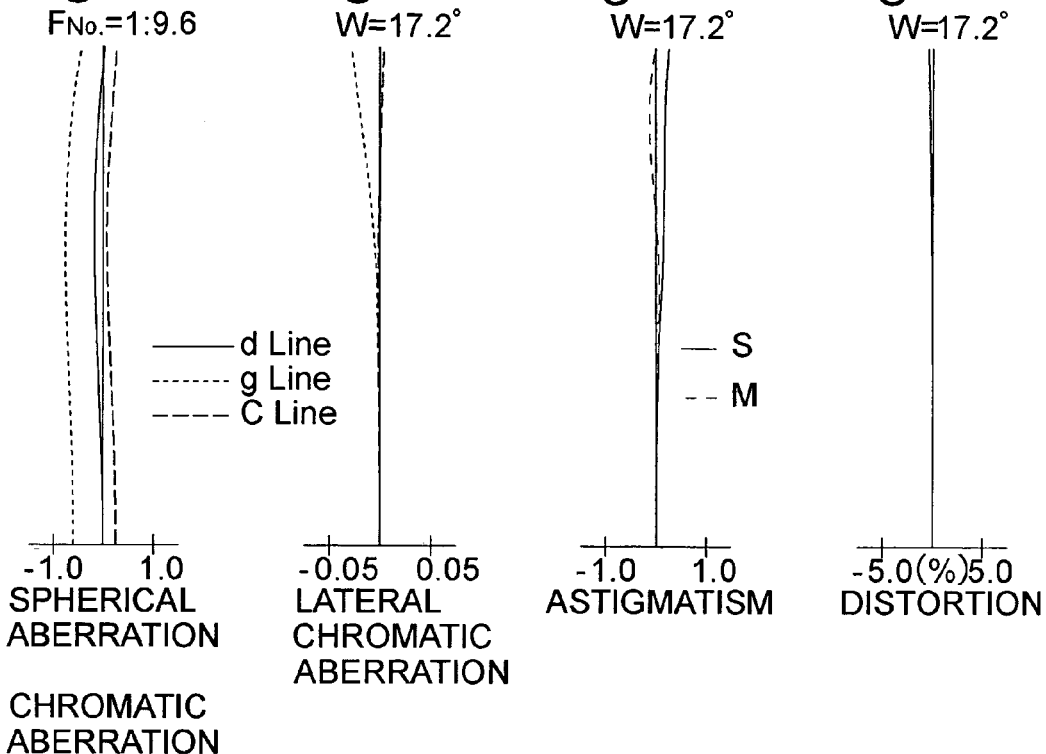
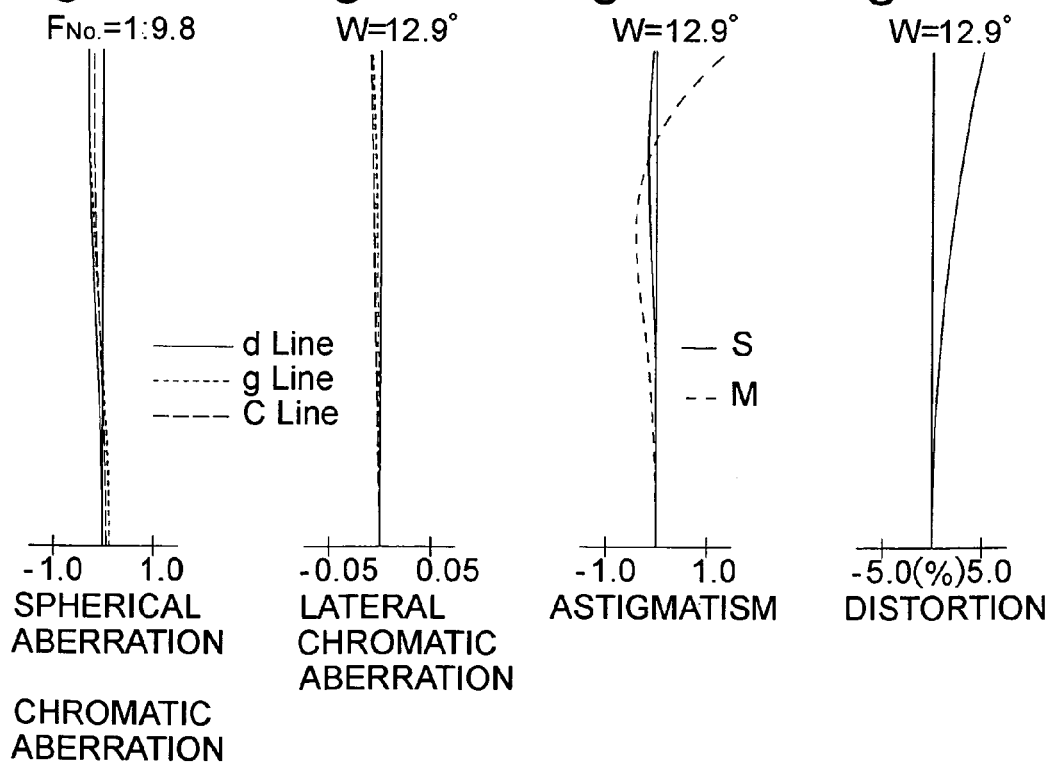

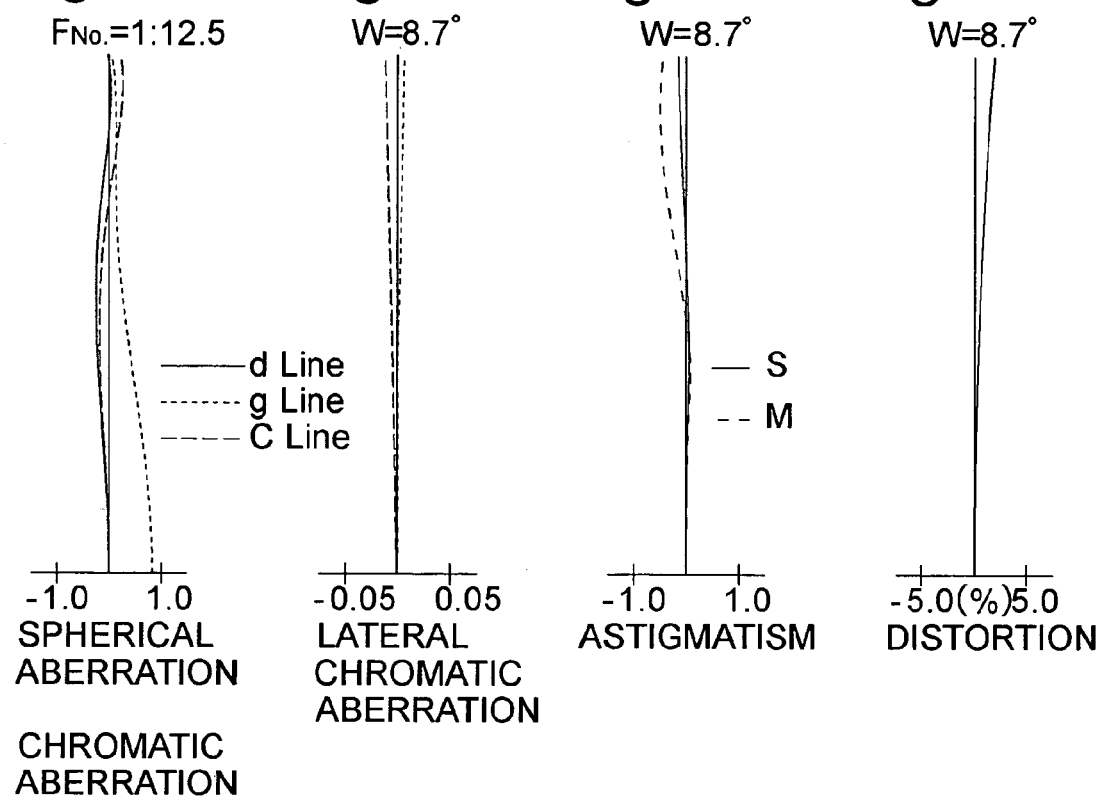

ZOOM LENS SYSTEM

BACKGROUND OF THE INVENTION

1. Field of the Invention

The present invention relates to a zoom lens system used in a photographic camera, especially a portable lens-shutter (compact) camera in which a photographing lens can be accommodated in a camera body thereof.

2. Description of the Prior Art

Unlike a zoom lens system for a single lens reflex (SLR) camera which requires space for a quick-return mirror behind the photographing lens system, a zoom lens system for a compact camera does not require a long back focal distance. As a zoom lens system which has a fewer requirements on the back focal distance, a telephoto-type optical system, having a positive lens group and a negative lens group in this order from the object, has been generally used.

In such a telephoto-type optical system, in the case where the zoom ratio is relatively small, e.g., approximately 3 or 4, a three-lens-group arrangement including a positive lens group, the other positive lens group, and a negative lens group in this order from the object, is employed.

In recent years, a zoom lens system for a compact camera has been required to have a higher zoom ratio and further miniaturization.

For example, Japanese Unexamined Patent Publication (JUPP) No. Hei-06-194573, JUPP No. Hei-09-120028, and JUPP No. Hei-10-268191 have disclosed a miniaturized zoom lens system with a higher zoom ratio; however, the zoom lens systems thereof are devised to mainly miniaturize the zoom lens system in the optical axis direction with respect to a photographic position of the zoom lens system and a fully-retracted position thereof. In other words, none of the zoom lens systems of the above publications has considered miniaturization of the zoom lens system in a direction perpendicular to the optical axis, i.e., in a radial direction of the zoom lens system.

SUMMARY OF THE INVENTION

The present invention provides a telephoto-type zoom lens system of a three (or more)-lens-group arrangement, which can attain both (i) miniaturization in the radial direction of the zoom lens system and (ii) a higher zoom ratio.

In a conventional telephoto-type zoom lens system, when zooming is performed from the short focal length extremity to the long focal length extremity, the distance from a first lens group (the most object-side lens group) having a positive refractive power (hereinafter, a positive first lens group) to a final lens group (the most image-side lens group) having a negative refractive power (hereinafter, a negative final lens group) is unchanged or monotonously increased. This distance is hereinafter defined as a lens total distance (LD). If an attempt is made to determine the diameter of each lens group so that peripheral illumination can be secured in all the focal length ranges from the short focal length extremity to the long focal length extremity, the inventor has found that not the focal length of the short focal length extremity but an intermediate focal length range determines the maximum diameter of the positive first lens group.

Accordingly, the present invention is devised to move the positive first lens group so that the distance from the positive first lens group to the negative final lens group becomes shortest at an intermediate focal length. Due to this arrangement, peripheral illumination at an intermediate focal length can be secured, so that the diameter of the positive first lens group can be made smaller. Consequently, the zoom lens system can be miniaturized in the radial direction.

In an aspect of the present invention, there is provided a zoom lens system including 'n' (n≧3) lens groups.

The zoom lens system includes a positive first lens group and a negative final lens group, in this order from the object.

The distance from the most object-side surface of the positive first lens group to the most image-side surface of the negative final lens group becomes shortest at an intermediate focal length between the short focal length extremity and the long focal length extremity.

The zoom lens system preferably satisfies the following condition:

$$1.0 < f_M/f_W < 3.0 \quad (1)$$

wherein $f_M$ designates an intermediate focal length of the zoom lens system at which the distance from the most object-side surface of the positive first lens group to the most image-side surface of the negative final lens group becomes shortest; and $f_W$ designates the focal length of the zoom lens system at the short focal length extremity.

The zoom lens system preferably satisfies the following condition:

$$0.3 < (LD_W - LD_M)/(f_T/f_W) < 1.0 \quad (2)$$

wherein $LD_W$ designates the distance from the most object-side surface of the positive first lens group to the most image-side surface of the negative final lens group, at the short focal length extremity;

$LD_M$ designates the distance from the most object-side surface of the positive first lens group to the most image-side surface of the negative final lens group, at the intermediate focal length $f_M$; and $f_T$ designates the focal length of the zoom lens system at the long focal length extremity.

By satisfying conditions (1) and (2), the positive first lens group can be miniaturized in the radial direction.

The zoom lens system preferably satisfies the following conditions to suitably correct aberrations while the zoom ratio is maintained higher:

$$0 < LD_T - LD_W \quad (3)$$

$$0.3 < (LD_T - LD_W)/(f_T/f_W) < 0.9 \quad (4)$$

wherein $LD_T$ designates the distance from the most object-side surface of the positive first lens group to the most image-side surface of the negative final lens group, at the long focal length extremity;

$LD_W$ designates the distance from the most object-side surface of the positive first lens group to the most image-side surface of the negative final lens group, at the short focal length extremity;

$f_T$ designates the focal length of the zoom lens system at the long focal length extremity; and $f_W$ designates the focal length of the zoom lens system at the short focal length extremity.

Furthermore, the zoom lens system of the present invention can satisfy the following condition:

$$3 < f_T/f_W \quad (5)$$

wherein $f_T$ designates the focal length of the zoom lens system at the long focal-length extremity; and fw designates the focal length of the zoom lens system at the short focal length extremity.

By satisfying this condition, a higher zoom ratio can be attained.

In the case where a three-lens-group arrangement is applied to the zoom lens system of the present invention, the zoom lens system includes the positive first lens group, a second lens group having a positive refractive power (hereinafter, a positive second lens group), and a third lens group (the final lens group) having a negative refractive power (hereinafter, a negative third lens group).

In the case where a four-lens-group arrangement is applied to the zoom lens system of the present invention, the zoom lens system includes the positive first lens group, a negative second lens group, and a positive third lens group, and a fourth lens group (the final lens group) having a negative refractive power (hereinafter, a negative fourth lens group).

The zoom lens system of the four-lens-group arrangement preferably satisfies the following condition:

$$1.2 < f_M/f_W < 3.0 \quad (6)$$

$f_M$ designates an intermediate focal length of the zoom lens system at which the distance from the most object-side surface of the positive first lens group to the most image-side surface of the negative fourth lens group becomes shortest; and fw designates the focal length of the zoom lens system at the short focal length extremity.

The zoom lens system of the four-lens-group arrangement preferably satisfies the following condition:

$$0.3 < (LD_T - LD_W)/(f_T/f_W) < 0.7 \quad (7)$$

wherein $LD_T$ designates the distance from the most object-side surface of the positive first lens group to the most image-side surface of the negative fourth lens group, at the long focal length extremity;

$LD_W$ designates the distance from the most object-side surface of the positive first lens group to the most image-side surface of the negative fourth lens group, at the short focal length extremity;

$f_T$ designates the focal length of the zoom lens system at the long focal length extremity; and fw designates the focal length of the zoom lens system at the short focal length extremity.

The zoom lens system of the four-lens-group arrangement preferably satisfies the following condition:

$$0.3 < (d_{23W} - d_{23T})/(f_T/f_W) < 1.5 \quad (8)$$

wherein $d_{23W}$ designates the axial distance between the negative second lens group and the positive third lens group at the short focal length extremity;

$d_{23T}$ designates the axial distance between the negative second lens group and the positive third lens group at the long focal length extremity;

$f_T$ designates the focal length of the zoom lens system at the long focal length extremity; and fw designates the focal length of the zoom lens system at the short focal length extremity.

By satisfying this condition, a higher zoom ratio can be obtained, while the overall length of the zoom lens system can be maintained shorter.

In the zoom lens system of the four-lens-group arrangement, by maintaining the traveling distance of the negative second lens group shorter, the zoom lens system can be miniaturized in the optical axis direction with respect to a photographic position of the zoom lens system and a fully-retracted position thereof.

In order to maintain the traveling distance of the negative second lens group shorter, the zoom lens system preferably satisfies the following condition:

$$-12 < f_T/f_{2G} < -9 \quad (9)$$

wherein $f_T$ designates the focal length of the zoom lens system at the long focal length extremity; and $f_{2G}$ designates the focal length of the negative second lens group.

The zoom lens system of the four-lens-group arrangement preferably satisfies the following condition:

$$1.05 < h_{3G}/h1 < 1.30 \quad (10)$$

wherein $h_{3G}$ designates the height of a paraxial light ray incident on the final surface of the positive third lens group; and $h1$ designates the height of a paraxial light ray incident on the first surface of the positive first lens group.

By satisfying this condition, a wider half-angle-of-view of 35 degrees or more can be attained, so that the back focal distance at the short focal length extremity can be secured.

In order to attain a higher zoom ratio, the zoom lens system of the four-lens-group arrangement preferably satisfies the following condition:

$$4.5 < f_T/f_W \quad (11)$$

wherein $f_T$ designates the focal length of the zoom lens system at the long focal length extremity; and fw designates the focal length of the zoom lens system at the short focal length extremity.

In the zoom lens system of the four-lens-group arrangement, the negative second lens group preferably includes at least one aspherical surface satisfying the following condition:

$$3 < \Delta I(2G)asp < 9 \quad (12)$$

wherein $\Delta I(2G)asp$ designates the amount of change of the spherical aberration coefficient due to the aspherical surface in the negative second lens group under the condition that the focal length of the zoom lens system at the short focal length extremity is converted to 1.0.

By satisfying this condition, the correcting of aberrations can be performed without increasing the number of lens elements, even if an attempt is made to make the power of the negative second lens group stronger in order to shorten the traveling distance thereof.

In the zoom lens system of the four-lens-group arrangement, the positive third lens group preferably includes at least one aspherical surface satisfying the following condition:

$$-40 < \Delta I(3G)asp < -10 \quad (13)$$

wherein $\Delta I(3G)asp$ designates the amount of change of the spherical aberration coefficient due to the aspherical surface in the positive third lens group under the condition that the focal length of the zoom lens system at the short focal length extremity is converted to 1.0.

By satisfying this condition, the number of lens elements of the positive third lens group can be reduced, and in particular, spherical aberration can be suitably corrected.

In the zoom lens system of the three-lens-group arrangement, the negative third (final) lens group preferably includes at least one aspherical surface satisfying the following condition:

$$0 < \Delta Vasp < 3 \quad (14)$$

wherein

ΔVasp designates the amount of change of the distortion coefficient due to the aspherical surface in the negative third lens group under the condition that the focal length of the zoom lens system at the short focal length extremity is converted to 1.0.

The present disclosure relates to subject matter contained in Japanese Patent Application No. 2004-79042 (filed on Mar. 18, 2004) which is expressly incorporated herein in its entirety.

BRIEF DESCRIPTION OF THE DRAWINGS

The present invention will be discussed below in detail with reference to the accompanying drawings, in which:

FIG. 4 is a lens arrangement of the zoom lens system according to a first embodiment of the present invention;

FIGS. 5A, 5B, 5C and 5D show aberrations occurred in the lens arrangement shown in FIG. 4, at the short focal length extremity;

FIG. 8 is a lens arrangement of the zoom lens system according to a second embodiment of the present invention;

FIGS. 9A, 9B, 9C and 9D show aberrations occurred in the lens arrangement shown in FIG. 8, at the short focal length extremity;

FIGS. 10A, 10B, 10C and 10D show aberrations occurred in the lens arrangement shown in FIG. 8, at an intermediate focal length;

FIGS. 11A, 11B, 11C and 11D show aberrations occurred in the lens arrangement shown in FIG. 8, at the long focal length extremity;

FIG. 12 is a lens arrangement of the zoom lens system according to a third embodiment of the present invention;

FIGS. 13A, 13B, 13C and 13D show aberrations occurred in the lens arrangement shown in FIG. 12, at the short focal length extremity;

FIGS. 14A, 14B, 14C and 14D show aberrations occurred in the lens arrangement shown in FIG. 12, at an intermediate focal length;

FIGS. 15A, 15B, 15C and 15D show aberrations occurred in the lens arrangement shown in FIG. 12, at the long focal length extremity;

FIG. 16 is a lens arrangement of the zoom lens system according to a fourth embodiment of the present invention;

FIGS. 17A, 17B, 17C and 17D show aberrations occurred in the lens arrangement shown in FIG. 16, at the short focal length extremity;

FIGS. 18A, 18B, 18C and 18D show aberrations occurred in the lens arrangement shown in FIG. 16, at an intermediate focal length;

FIGS. 19A, 19B, 19C and 19D show aberrations occurred in the lens arrangement shown in FIG. 16, at the long focal length extremity;

FIG. 20 is a lens arrangement of the zoom lens system according to a fifth embodiment of the present invention;

FIGS. 21A, 21B, 21C and 21D show aberrations occurred in the lens arrangement shown in FIG. 20, at the short focal length extremity;

FIGS. 22A, 22B, 22C and 22D show aberrations occurred in the lens arrangement shown in FIG. 20, at an intermediate focal length;

FIGS. 23A, 23B, 23C and 23D show aberrations occurred in the lens arrangement shown in FIG. 20, at the long focal length extremity;

FIG. 24 is a lens arrangement of the zoom lens system according to a sixth embodiment of the present invention;

FIGS. 25A, 25B, 25C and 25D show aberrations occurred in the lens arrangement shown in FIG. 24, at the short focal length extremity;

FIGS. 26A, 26B, 26C and 26D show aberrations occurred in the lens arrangement shown in FIG. 24, at a fist intermediate focal length (before switching);

FIGS. 27A, 27B, 27C and 27D show aberrations occurred in the lens arrangement shown in FIG. 24, at a second intermediate focal length (after switching);

FIGS. 28A, 28B, 28C and 28D show aberrations occurred in the lens arrangement shown in FIG. 24, at the long focal length extremity;

DESCRIPTION OF THE PREFERRED EMBODIMENTS

Figure 1:
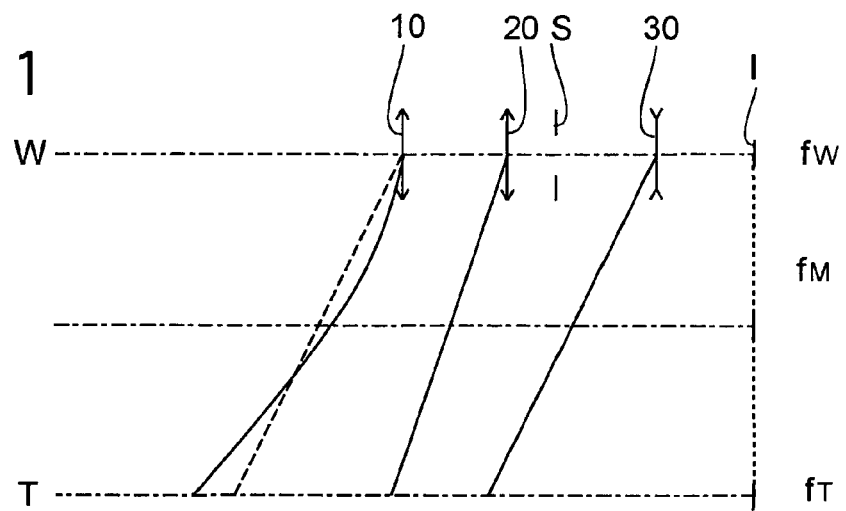
FIG. 1 is schematic lens-group moving paths for a telephoto-type zoom lens system of a three-lens-group arrangement, according to the present invention.

FIG. 1 is schematic lens-group moving paths for a telephoto-type zoom lens system of a three-lens-group arrangement.

The telephoto-type zoom lens system of the three-lens-group arrangement includes a positive first lens group 10, a positive second lens group 20, a diaphragm S, and a negative third lens group 30, in this order from the object. A symbol 'I' designates the imaging plane.

Upon zooming from the short focal length extremity (W) to the long focal length extremity (T), the positive first lens group 10 first moves towards the image with respect to a hypothetical lens-group moving path (the broken line) parallel to the lens-group moving path of the negative third lens group 30, i.e., along these two lens-group moving paths, the lens total distance: (LD) is unchanged upon zooming; and thereafter, the positive first lens group 10 moves toward the object.

The positive second lens group 20 and the negative third lens group 30 move monotonously towards the object.

Upon zooming, the distance between the positive first lens group 10 and the positive second lens group 20 first decreases and thereafter increases; and the distance between the positive second lens group 20 and the negative third lens group 30 decreases.

The diaphragm S moves together with the positive second lens group 20.

Consequently, the distance from the most object-side surface (surface No. 1) of the positive first lens group 10 to the most image-side surface of the negative third lens group 30 (the final surface) becomes shortest not at the short focal length extremity (W), but at an intermediate focal length $f_M$ between the short focal length extremity (W) and the long focal length extremity (T).

Figure 2:
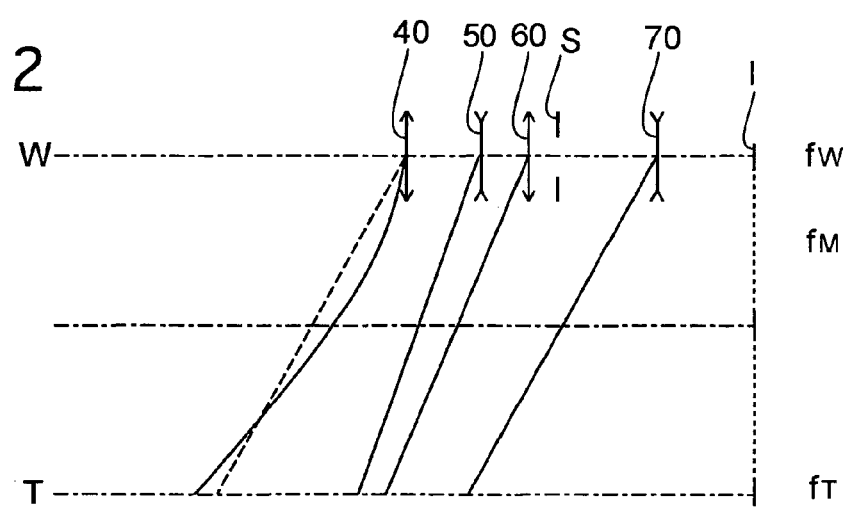
FIG. 2 is schematic lens-group moving paths for a telephoto-type zoom lens system of a four-lens-group arrangement, according to the present invention.

FIG. 2 is schematic lens-group moving paths for a telephoto-type zoom lens system of a four-lens-group arrangement.

The telephoto-type zoom lens system of the four-lens-group arrangement includes a positive first lens group 40, a negative second lens group 50, a positive third lens group 60, a diaphragm S, and a negative fourth lens group 70, in this order from the object. A symbol 'I' designates the imaging plane.

Upon zooming from the short focal length extremity (W) to the long focal length extremity (T), the positive first lens group 10 first moves towards the image with respect to a hypothetical lens-group moving path (the broken line) parallel to the lens-group moving path of the negative fourth lens group 70, i.e., along these two lens-group moving paths, the lens total distance (LD) is unchanged upon zooming; and thereafter, the positive first lens group 10 moves toward the object.

The negative second lens group 50, the positive third lens group 60 and the negative fourth lens group 70 move monotonously towards the object.

Upon zooming, the distance between the positive first lens group 40 and the negative second lens group 50 first decreases and thereafter increases; the distance between the negative second lens group 50 and the positive third lens group 60 monotonously decreases; and the distance between the positive third lens group 60 and the negative fourth lens group 70 monotonously decreases.

The diaphragm S moves together with the positive third lens group 60.

Consequently, the distance from the most object-side surface (surface No. 1) of the positive first lens group 10 to the most image-side surface of the negative fourth lens group 70 (the final surface) becomes shortest not at the short focal length extremity (W), but at an intermediate focal length $f_M$ between the short focal length extremity (W) and the long focal length extremity (T).

Figure 3:
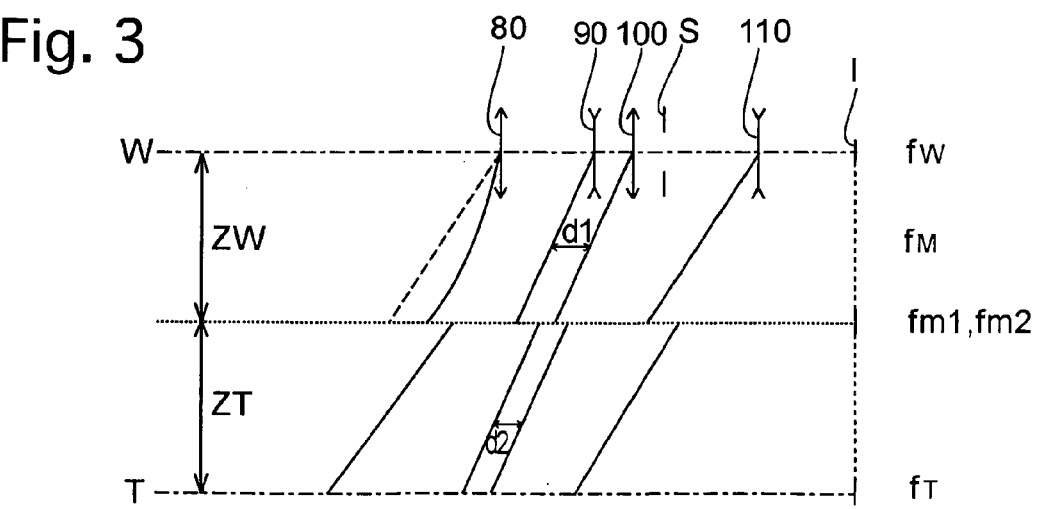
FIG. 3 is schematic lens-group moving paths, with a switching movement of the lens groups, for a telephoto-type zoom lens system of a four-lens-group arrangement, according to the present invention.
Figure 6A:
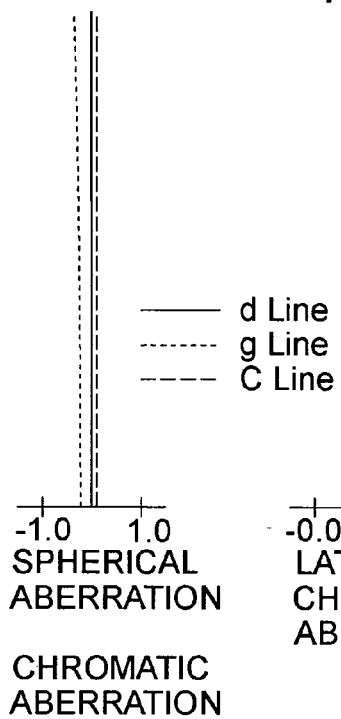
FIGS. 6A, 6B, 6C and 6D show aberrations occurred in the lens arrangement shown in FIG. 4, at an intermediate focal length.
Figure 6B:
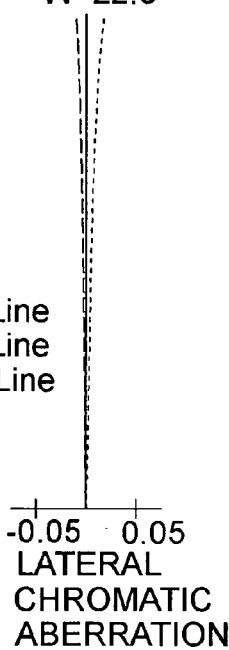
Figure 6C:
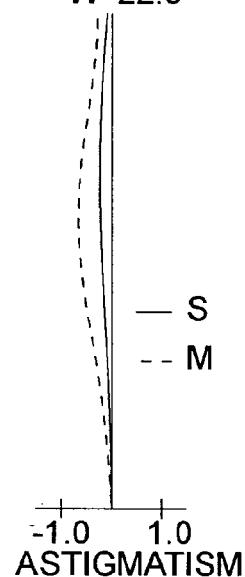
Figure 6D:
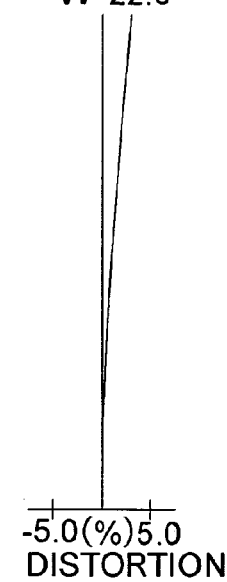
Figure 7A:
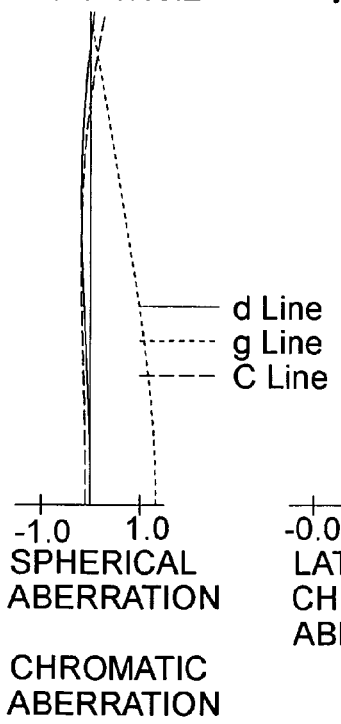
FIGS. 7A, 7B, 7C and 7D show aberrations occurred in the lens arrangement shown in FIG. 4, at the long focal length extremity.
Figure 7B:
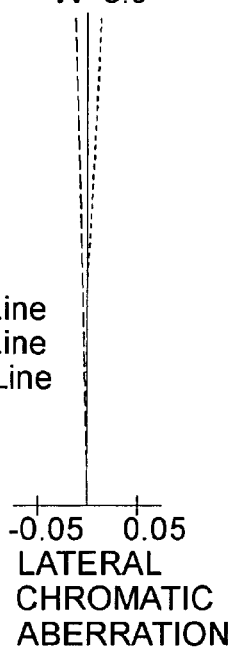
Figure 7C:
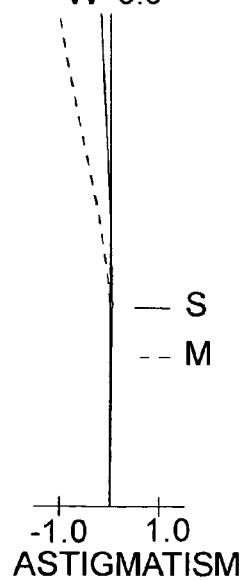
Figure 7D:
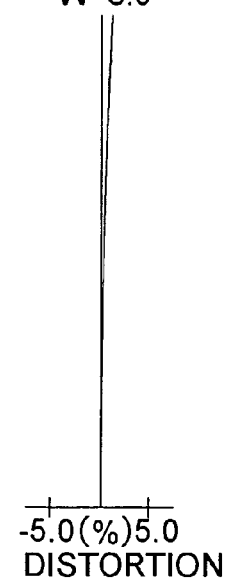

FIG. 3 is schematic lens-group moving paths, with a switching movement of the lens groups, for a telephoto-type zoom lens system of a four-lens-group arrangement.

The telephoto-type zoom lens system of the four-lens-group arrangement includes a positive first lens group 80, a negative second lens group 90, a positive third lens group 100, a diaphragm S, and a negative fourth lens group 110, in this order from the object. A symbol 'I' designates the imaging plane.

As shown in FIG. 3, the zooming range is divided into the two ranges, i.e., a focal-length range ZW (the first focal-length range; the short-focal-length side zooming range) from the short focal length extremity f(W) to the first intermediate focal length fm1; and a focal-length range ZT (the second focal-length range; the long-focal-length side zooming range) from the second intermediate focal length fm2 to the long focal length extremity f(T).

Upon zooming from the short focal length extremity (W) to the long focal length extremity (T), the positive first lens group 80 first moves towards the image, at an intermediate focal length $f_M$ in the first focal-length range ZW, with respect to a hypothetical lens-group moving path (the broken line) parallel to the lens-group moving path of the negative fourth lens group 110, i.e., along these two lens-group moving paths, the lens total distance (LD) is unchanged upon zooming; and thereafter, the positive first lens group 80 moves toward the object.

The negative second lens group 90, the positive third lens group 100 and the negative fourth lens group 110 move monotonously towards the object in the first focal-length range ZW.

At the first intermediate focal length fm1 (before switching), the positive first lens group 80, the negative second lens group 90, the positive third lens group 100, and the negative fourth lens group 110 are moved towards the imaging plane 'I' by a predetermined distance, so that the first intermediate focal length fm1 is changed to the second intermediate focal length fm2 (after switching).

In the second focal-length range ZT, the positive first lens group 80, the negative second lens group 90, the positive third lens group 100, and the negative fourth lens group 110 are moved towards the object.

In the first focal-length range ZW, the negative second lens group 90 and the positive third lens group 30 maintains a first distance (d1).

At the first intermediate focal length fm1, the distance (d1) between the negative second lens group 90 and the positive third lens group 100 is reduced to a second distance (d2) which is shorter than the first (d1).

In the second focal-length range ZT, the negative second lens group 90 and the positive third lens group 100 maintain the second distance (d2).

The first intermediate focal length fm1 belongs to the first focal-length range ZW.

The second intermediate focal length fm2 is determined after the following movement of the lens groups is completed:

(i) the positive first lens group 80 and the negative fourth lens group 110 are moved from the positions thereof, corresponding to the first intermediate focal length fm1, toward the image; and (ii) the negative second lens group 90 and the positive third lens group 100 reduce the distance therebetween.

The diaphragm S is provided in between the positive third lens group 100 and the negative fourth lens group 110, and moves together with the positive third lens group 100.

Consequently, the distance from the most object-side surface (surface No. 1) of the positive first lens group 80 to the most image-side surface of the negative fourth lens group 110 (the final surface) becomes shortest not at the short focal length extremity (W), but at an intermediate focal length $f_M$ in the first focal-length range ZW.

As discussed above, the lens-group moving paths are determined so that the lens total distance (LD) becomes shortest not at the short focal length extremity (W), but at an intermediate focal length $f_M$.

Due to this arrangement, at an intermediate focal length $f_M$, the height of the most peripheral light bundle (the light bundle toward the maximum image height) passing through the positive first lens group (10, 40, 80) is made lower. Namely, the most peripheral light bundle has conventionally been incident on the extreme periphery of the first lens element of the positive first lens group (e.g., refer to FIG. 30). According to the arrangement mentioned above, the height of the most peripheral light bundle incident on the first surface of the positive first lens group 10, 40, 80) can largely be lowered, which will be discussed below in detail.

Due to the above arrangement, there are at least the following advantages:

(i) the diameter of the positive first lens group (10, 40, 80) can be made smaller;

(ii) the diameter of the lens groups of the entire zoom lens system can also be made smaller, so that the thickness of a lens element can be made thinner; and (iii) the thickness of the lens groups can be made thinner, so that miniaturization of the camera body in the optical axis direction can be attained.

Figure 29:
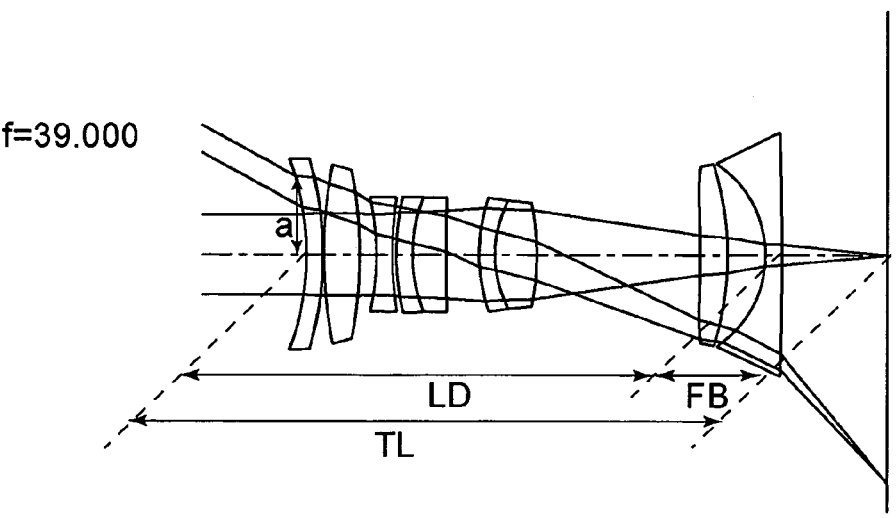
FIG. 29 illustrates the bundles of light rays in the zoom lens system of FIG. 4.
Figure 30:
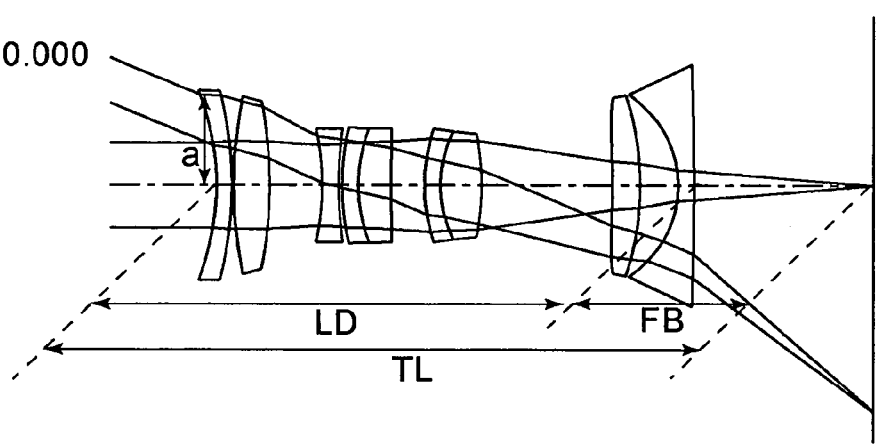
FIG. 30 illustrates the bundles of light rays in the zoom lens system of FIG. 4 when zooming is performed to the focal length of 50.000 according to conventional lens-group moving paths.
Figure 31:
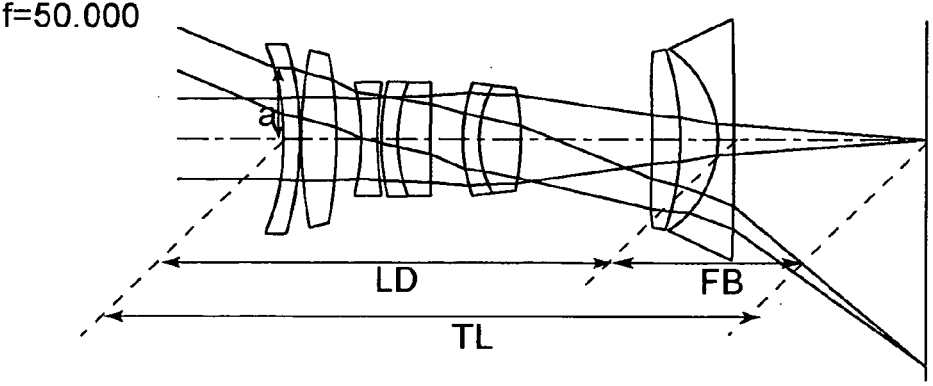
FIG. 31 illustrates the bundles of light rays in the zoom lens system of FIG. 4 when zooming is performed to the focal length of 50.000 according to the lens-group moving paths of the present invention.

With FIGS. 29 to 31, the following two cases are compared and discussed:

(1) the lens total distance (LD=TL−FB) becomes shortest at the short focal length extremity (W) (FIG. 30); and (2) the lens total distance (LD=TL−FB) becomes shortest at an intermediate focal length $f_M$ (FIG. 31).

FIG. 29 illustrates the bundles of light rays in the zoom lens system of FIG. 4; and in FIG. 29, zooming is performed to the focal length of 39.000 corresponding to the short focal length extremity (W) of the first embodiment which will be discussed in detail. Moreover, note that in the zoom lens system of FIG. 4, each lens group is arranged to move along the lens group moving paths of FIG. 1.

FIG. 30 illustrates the bundles of light rays in the zoom lens system of FIG. 4 when zooming is performed to the focal length of 50.000 (corresponding to the intermediate focal length of the first embodiment) according to conventional lens-group moving paths where the lens total distance (LD=TL−FB) becomes shortest at the short focal length extremity (W).

FIG. 31 illustrates the bundles of light rays in the zoom lens system of FIG. 4 when zooming is performed to the focal length of 50.000 (corresponding to the intermediate focal length of the first embodiment) according to the lens-group moving paths of the present invention where the lens total distance (LD=TL−FB) becomes shortest at the intermediate focal length $f_M$ between the short focal length extremity (W) and the long focal length extremity (T).

In each of FIGS. 29 through 31, the axial light bundle which are determined by the f-number is depicted, and the maximum image height (y=21.64) is depicted as well.

With respect to FIGS. 30 and 31, the upper light rays and the lower light rays are determined so that the amount of peripheral illumination at the maximum image height in FIG. 30 is substantially the same as the amount of peripheral illumination at the maximum image height in FIG. 31. In other words, the substantially same conditions are provided to compare the height 'a' in these figures. Here, FIG. 30 and FIG. 31 are compared with respect to the height 'a'.

According to FIG. 31, it should be understood that the height 'a' of the light bundle from the optical axis, which is incident on the most object-side surface of the positive first lens group 10, and which corresponds to the maximum image height (y=21.64), is apparently lower than the height 'a' shown in FIG. 30.

Namely, in the case of the conventional lens-group moving paths (FIG. 30), when zooming is performed, the above-explained height 'a' of the light bundle from the optical axis becomes higher at the focal length of 50.000 than at the short focal length extremity (W).

On the other hand, in the case of the lens-group moving paths of the present invention (FIG. 31), when zooming is performed, the above-explained height 'a' of the light bundle from the optical axis becomes lower at the focal length of 50.000 than at the short focal length extremity (W).

Accordingly, if an attempt is made to determine the lens-group moving paths so that the lens total distance (LD) becomes shortest at an intermediate focal length $f_M$, the above-explained height 'a' from the optical axis becomes maximum at the short focal length extremity (W) where the angle-of-view becomes maximum, and the height 'a' becomes lower according to zooming toward the long focal length extremity (T).

Due to the above arrangement, the diameter of the positive first lens group (10) can be made smaller, while peripheral illumination is secured. Furthermore, along with miniaturization of the positive first lens group (10) in the radial direction, the diameter of the other lens groups (20, 30) can also be made smaller in the radial direction. Consequently, the thickness of a lens element can be made thinner, and miniaturization of the camera body in the optical axis direction can be attained.

Conditions (1) through (5) and condition (14), which will be explained in detail, are applied to the zoom lens system of the three lens groups or more.

Condition (1) specifies an intermediate focal length $f_M$ at which the lens total distance (LD) becomes shortest. By satisfying this condition, the diameter of the positive first lens group 10 can be made smaller.

If $f_M/f_W$ exceeds the upper limit of condition (1), the intermediate focal length $f_M$ at which the lens total distance (LD) becomes shortest too closely approaches the short focal length extremity (W).

If $f_M/f_W$ exceeds the lower limit of condition 1), the intermediate focal length $f_M$ too closely approaches the long focal length extremity (T).

In either case, the effect on miniaturization of the positive first lens group 10 in the radial direction cannot be expected.

Condition (2) is for effectively making the lens total distance (LD) at an intermediate focal length $f_M$ shorter.

If $(LD_W - LD_M)/(f_T/f_W)$ exceeds the upper limit of condition (2), the lens total distance (LD) becomes too short at the intermediate focal length $f_M$. Consequently, the correcting of aberrations becomes difficult.

If $(LD_W - LD_M)/(f_T/f_W)$ exceeds the lower limit of condition (2), the difference of the lens total distance (LD) at the intermediate focal length $f_M$ and at the short focal length extremity (W) becomes smaller. As a result, the effect on miniaturization of the positive first lens group 10 in the radial direction is decreased.

Condition (3) specifies the lens total distance (LD) at the short focal length extremity (W) and the long focal length extremity (T) respectively. By satisfying this condition, the correcting of aberrations can be made adequately, while a zoom ratio can be made larger.

If $LD_T - LD_W$ exceeds the lower limit of condition (3), i.e., since the lens total distance (LD) at the long focal length extremity (T) is less than the lens total distance (LD) at the short focal length extremity (W), the traveling distance of each lens group is restricted. Consequently, a higher zoom ratio cannot be attained.

It would be possible to apply the present invention to an optical system with a lower zoom ratio; however, there would be no practical advantage in doing so.

Condition (4) specifies the amount of change in the lens total distance (LD) from the short focal length extremity (W) to the long focal length extremity (T). By satisfying this condition, the correcting of aberrations can be made adequately, while a zoom ratio can be made larger.

If $(LD_T-LD_W)/(f_T/f_W)$ exceeds the upper limit of condition (4), the traveling distance of each lens group becomes longer. A longer traveling distance of a lens group is advantageous for attaining a higher zoom ratio and for correcting aberrations; however, the lens total distance (LD) on the side of the long focal length extremity (T) becomes too long. As a result, designing the mechanical structure of the zoom lens system becomes difficult.

If $(LD_T-LD_W)/(f_T/f_W)$ exceeds the lower limit of condition (4), it becomes difficult to sufficiently secure the traveling distance of each lens group. Under the circumstances, if an attempt is made to intentionally obtain a higher zoom ratio, the power of each lens group becomes stronger. As a result, the correcting of aberrations on the side of the long focal length extremity (T) becomes particularly difficult. Aberrations may be corrected by an aspherical surface and the like. However, each lens group has higher sensitivity to an assembly error, so that such an arrangement is not optically practical.

Condition (5) specifies the zoom ratio of the entire zoom lens system.

It would not be impossible to employ the lens arrangement of the present invention to an optical system with a zoom ratio which exceeds the lower limit of condition (5). However, there is no practical advantage in doing so.

Conditions (6) through (13), which will be explained in detail, are applied to the zoom lens system of the four lens groups, i.e., a positive first lens group a negative second lens group, a positive third lens group and a negative fourth lens group, in this order from the object.

Condition (6) specifies an intermediate focal length $f_M$ at which the lens total distance (LD) becomes shortest. By satisfying this condition, the diameter of the positive first lens group (40, 80) can be made smaller.

If $f_M/f_W$ does not satisfy condition (6), the intermediate focal length $f_M$ at which the lens total distance (LD) becomes shortest too closely approaches the short focal length extremity (W) or the long focal length extremity (T). Consequently, the effect on miniaturization of the positive first lens group (40, 80) in the radial direction cannot be expected.

The lower limit of condition (6) is more limited than that of condition (1), i.e., the range of condition (6) is narrower than that of condition (1). This is because in the case of the four-lens-group arrangement, the intermediate focal length $f_M$ is preferably set a little closer to the long focal length extremity (T) than in the case of the three-lens-group arrangement, from the viewpoint of advantageously attaining miniaturization of the positive first lens group (40, 80) in the radial direction.

Condition (7) specifies the amount of change in the lens total distance (LD) from the short focal length extremity (W) to the long focal length extremity (T). By satisfying this condition, the correcting of aberrations can be made adequately, while a zoom ratio can be made larger.

If $(LD_T-LD_W)/(f_T/f_W)$ exceeds the upper limit of condition (7), the traveling distance of each lens group becomes longer. A longer traveling distance of a lens group is advantageous for attaining a higher zoom ratio and for correcting aberrations; however, in the lens total distance (LD) on the side of the long focal length extremity (T) becomes too long. As a result, designing the mechanical structure of the zoom lens system becomes difficult.

If $(LD_T-LD_W)/(f_T/f_W)$ exceeds the lower limit of condition (7), it becomes difficult to sufficiently secure the traveling distance of each lens group. Under the circumstances, if an attempt is made to intentionally obtain a higher zoom ratio, the power of each lens group becomes stronger. As a result, the correcting of aberrations on the side of the long focal length extremity (T) becomes difficult. Aberrations may be corrected by a aspherical surface and the like. However, each lens group has higher sensitivity to an assembly error, so that such an arrangement is not optically practical.

The upper limit of condition (7) is more limited than that of condition (4), i.e., the range of condition (7) is narrower than that of condition (4). This is because in the case of the four-lens-group arrangement, the number of lens groups which can be made movable for a zooming operation is larger than in the case of the three-lens-group arrangement, a higher zoom ratio can be attained even if the change in the lens total distance (LD) is smaller.

Condition (8) specifies the amount of change in the distance between the negative second lens group (50, 90) and the positive third lens group (60, 100). By satisfying this condition, a zoom ratio can be made higher, while an increase of the lens total distance (LD) is prevented.

If $(d_{23W}-d_{23T})/(f_T/f_W)$ exceeds the upper limit of condition (8), the amount of change in distance between the negative second lens group (50, 90) and the positive third lens group (60, 100) becomes larger. A longer distance therebetween is advantageous for attaining a higher zoom ratio and for correcting aberrations; however, the lens total distance (LD) becomes undesirably longer.

If $(d_{23W}-d_{23T})/(f_T/f_W)$ exceeds the lower limit of condition (8), the amount of change in distance between the negative second lens group (50, 90) and the positive third lens group (60, 100) becomes smaller. Consequently, the zooming effect by the combination of the negative second lens group (50, 80) and the positive third lens group (60,100) becomes smaller, and the zooming effect to be attained by the zoom lens system of the four-lens-group arrangement becomes insufficient.

Condition (9) specifies the focal length of the negative second lens group (50,90). By satisfying this condition, a suitable power can be provided in the negative second lens group (50,90). Even if an attempt is made to attain a higher zoom ratio, the traveling distance of the negative second lens group (50,90) can be maintained shorter, and miniaturization of the zoom lens system can be attained.

If $f_T/f_{2G}$ exceeds the lower limit of condition (9), the power of the negative second lens group (50,90) becomes too strong. As a result, aberrations largely occur in the negative second lens group (50,90), and it becomes difficult to correct aberration fluctuations upon zooming.

If $f_T/f_{2G}$ exceeds the upper limit of condition (9), the power of the negative second lens group (50,90) becomes too weak. Consequently, if a zoom ratio is made higher, the traveling distance of the negative second lens group (50,90) becomes longer, so that miniaturization of the zoom lens system cannot be attained.

Condition (10) specifies the ratio of the height of a paraxial light ray incident on the final surface of the positive third lens group (60, 100) to the height of a paraxial light ray incident on the first surface of the positive first lens group (40, 80). Here, the height 'h' is defined a position, from the optical axis, where the most peripheral light ray of a paraxial light bundle is incident.

By satisfying this condition, a wider half-angle-of-view of 35 degrees or more can be attained, so that the back focal distance at the short focal length extremity (W) can be secured.

If $h_{3G}/h1$ exceeds the upper limit of condition (10), the correcting of aberrations from the positive first lens group (40, 80) to the positive third lens group (60, 100) becomes difficult. Accordingly, if an attempt is made to adequately correct aberrations, the number of lens elements increases, so that the size of the zoom lens system undesirably increases.

If $h_{3G}/h1$ exceeds the lower limit of condition (10) is exceeded, it becomes difficult to secure a sufficient back focal distance when the half angle-of-view is set to 35 degrees or more. If the back focal distance becomes too short, the diameter of the negative fourth lens group (70, 110) becomes too large. As a result, the effect on miniaturization of the positive first lens group (40, 80) in the radial direction becomes smaller, and an image of foreign matter stuck to the most image-side surface of the positive third lens group (60, 100) becomes noticeable on the imaging plane 'I'.

Condition (11) specifies the zoom ratio of the entire zoom lens system.

It is possible to employ the lens arrangement of the present invention to an optical system with a zoom ratio which exceeds the lower limit of condition (11). However, there is no practical advantage in doing so.

Condition (12) specifies the amount of asphericity in the case where at lease one aspherical surface is provided in the negative second lens group (50, 90). By satisfying this condition, even when the power of the negative second lens group (50, 90) becomes stronger to make the traveling distance thereof shorter, the correcting of aberrations, in particular, spherical aberration, can be performed without increasing the number of lens elements of the negative second lens group (50, 90).

If ΔI(2G)asp exceeds the upper limit of condition (12), the amount of asphericity becomes larger, so that manufacture of the lens element with the aspherical surface becomes difficult.

If ΔI(2G)asp exceeds the lower limit of condition (12), the effect of the correcting of spherical aberration through the aspherical surface becomes smaller.

Condition (13) specifies the amount of asphericity in the case where at lease one aspherical surface is provided in the positive third lens group (60, 100).

If ΔI(3G)asp exceeds the upper limit of condition (13), the effect of the correcting of spherical aberration through the aspherical surface becomes smaller.

If ΔI(3G)asp exceeds the lower limit of condition (13), the amount of asphericity becomes larger, so that manufacture of the lens element with the aspherical surface becomes difficult.

Condition (14) specifies the amount of asphericity in the case where at lease one aspherical surface is provided in the negative fourth lens group (70, 110), i.e., the final lens group. By satisfying this condition, the number of lens elements of the final lens group can be reduced, and distortion can suitably corrected at the short focal length extremity (W).

If ΔVasp exceeds the upper limit of condition (14), the amount of asphericity becomes larger, so that manufacture of the lens element with the aspherical surface becomes difficult.

If ΔVasp exceeds the lower limit of condition (14), the effect of the correcting of distortion through the aspherical surface becomes smaller.

Specific numerical data of the embodiments will be described hereinafter. In the diagrams of chromatic aberration represented by spherical aberration, the solid line and the two types of dotted lines respectively indicate spherical aberrations with respect to the d, g and C lines. Also, in the diagrams of lateral chromatic aberration, the two types of dotted lines respectively indicate magnification with respect to the g and C lines; however, the d line as the base line coincides with the ordinate. S designates the sagittal image, and M designates the meridional image. In the tables, $F_{NO}$ designates the f-number, f designates the focal length of the entire zoom lens system, $f_B$ designates the back focal distance, W designates the half angle-of-view (°), r designates the radius of curvature, d designates the lens-element thickness or distance between lens elements, $N_d$ designates the refractive index of the d-line, and $\nu_d$ designates the Abbe number.

In addition to the above, an aspherical surface which is symmetrical with respect to the optical axis is defined as follows:

$$x=cy^2/(1+[1-\{1+K\}c^2y^2]^{1/2})+A4y^4+A6y^6+A8y^8+A10y^{10}\ldots$$

wherein:
c designates a curvature of the aspherical vertex (1/r);
y designates a distance from the optical axis;
K designates the conic coefficient; and
A4 designates a fourth-order aspherical coefficient;
A6 designates a sixth-order aspherical coefficient;
A8 designates a eighth-order aspherical coefficient; and
A10 designates a tenth-order aspherical coefficient.

Furthermore, the relationship between the aspherical coefficients and aberration coefficients is discussed as follows:

1. The shape of an aspherical surface is defined as follows:

$$x=cy^2/(1+[1\{1+K\}c^2y^2]^{1/2})+A4y^4+A6y^6+A8y^8+A10y^{10}\ldots$$

wherein:
x designates a distance from a tangent plane of an aspherical vertex;
y designates a distance from the optical axis;
c designates a curvature of the aspherical vertex (1/r),
K designates a conic constant;

2. In this equation, to obtain the aberration coefficients, the following substitution is made to replace K with "0" (Bi=Ai when K=0).
B4=A4+Kc³/8;
B6=A6+(K²+2K)c⁵/16;
B8=A8+5(K³+3K²+3K)c⁷/128
B10=A10+7(K⁴+4K³+6K²+4K)c⁹/256; and therefore, the following equation is obtained:

$$x=cy^2/[1+[1-c^2y^2]^{1/2}]+B4y^4+B6y^6+B8y^8+B10y^{10}+\ldots$$

3. Furthermore, in order to normalize the focal length f to 1.0, the followings are considered:

$$X=x/f;\ Y=y/f;\ C=f*c;$$

$$\alpha4=f^3B4;\ \alpha6=f^5B6;\ \alpha8=f^7B8;\ \alpha10=f^9B10$$

Accordingly, the following equation is obtained.

$$X=CY^2/[1+[1-C^2Y^2]^{1/2}]+\alpha4Y^4+\alpha6Y^6+\alpha8Y^8+\alpha10Y^{10}+\ldots$$

4. Φ=8(N'−N)α4 is defined, and the third aberration coefficients are defined as follows:
I designates the spherical aberration coefficient;
II designates the coma coefficient;
III designates the astigmatism coefficient;
IV designates the curvature coefficient of the sagittal image surface; and V designates a distortion coefficient; and therefore, the influence of the fourth-order aspherical-surface coefficient ($\alpha 4$) on each aberration coefficient is defined as:

$\Delta I = h^4 \Phi$ $\Delta II = h^3 k \Phi$ $\Delta III = h^2 k^2 \Phi$ $\Delta IV = h^2 k^2 \Phi$ $\Delta V = h k^3 \Phi$ wherein h1 designates the height at which a paraxial axial light ray strikes the first surface of the lens system including the aspherical surface;

h designates the height at which the paraxial axial light ray strikes the aspherical surface when the height h1 is 1;

k1 designates the height at which a paraxial off-axis ray, passing through the center of the entrance pupil, strikes the first surface of the lens system including the aspherical surface;

k designates the height at which the paraxial off-axis light ray strikes the aspherical surface when the height k1 is −1;

N' designates the refractive index of a medium on the side of the image with respect to the aspherical surface; and N designates the refractive index of a medium on the side of the object with respect to the aspherical surface.

[Embodiment 1]

In the first embodiment, the telephoto-type zoom lens system employs the three-lens-group arrangement, and each lens group of the zoom lens system is arranged to move along the lens-group moving paths of FIG. 1.

FIG. 4 is the lens arrangement of the zoom lens system according to the first embodiment of the present invention. FIGS. 5A through 5D show aberrations occurred in the lens arrangement shown in FIG. 4, at the short focal length extremity (W). FIG. 6A through 6D show aberrations occurred in the lens arrangement shown in FIG. 4, at an intermediate focal length (fM). FIGS. 7A through 7D show aberrations occurred in the lens arrangement shown in FIG. 4, at the long focal length extremity (T).

Table 1 shows the numerical data of the first embodiment.

The values $F_{NO}$, W, $f_B$, and the d values at surface Nos. 4 and 12 are shown in the order fW, fM, and fT.

The diaphragm S is provided 1.00 behind the positive second lens group 20 (surface No. 12).

The positive first lens group 10 includes a negative meniscus lens element having the concave surface facing toward the object, and a positive lens element, in this order from the object.

The positive second lens group 20 includes a negative biconcave lens element, cemented lens elements having a negative meniscus lens element having the convex surface facing toward the object and a positive lens element, and cemented lens elements having a negative meniscus lens element having the convex surface facing toward the object and a positive lens element, in this order from the object.

The third lens group 30 includes a positive single lens element and a negative single lens element, in this order from the object.

TABLE 1

$F_{NO} = 1:5.1–6.5–13.2$
$f = 39.00–50.00–136.00$
$W = 28.4–22.8–8.9$
$f_B = 9.98–18.24–67.56$

| Surf. No. | r | d | $N_d$ | $v_d$ |
|---|---|---|---|---|
| 1 | −24.896 | 1.50 | 1.84666 | 23.8 |
| 2 | −33.600 | 0.10 | — | — |
| 3 | 42.300 | 3.40 | 1.48749 | 70.2 |
| 4 | −42.300 | 1.58–2.40–16.29 | — | — |
| 5 | −22.785 | 1.50 | 1.88300 | 40.8 |
| 6 | 35.571 | 0.36 | — | — |
| 7 | 23.707 | 1.50 | 1.83400 | 37.2 |
| 8 | 14.791 | 3.12 | 1.76182 | 26.5 |
| 9 | 224.000 | 3.06 | — | — |
| 10 | 17.239 | 1.50 | 1.84666 | 23.8 |
| 11 | 11.785 | 3.84 | 1.58547 | 29.9 |
| 12* | −22.805 | 15.39–12.34–3.55 | — | — |
| 13* | −76.811 | 2.60 | 1.58547 | 29.9 |
| 14 | −27.979 | 3.55 | — | — |
| 15 | −10.447 | 1.50 | 1.69680 | 55.5 |
| 16 | −365.980 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 12 | 0.00 | $0.67142 \times 10^{-4}$ | $-0.63070 \times 10^{-7}$ | — |
| 13 | 0.00 | $0.84681 \times 10^{-4}$ | $-0.23961 \times 10^{-6}$ | $0.71242 \times 10^{-8}$ |

[Embodiment 2]

In the second embodiment, the telephoto-type zoom lens system employs the three-lens-group arrangement, and each lens group of the zoom lens system is arranged to move along the lens-group moving paths of FIG. 1.

FIG. 8 is the lens arrangement of the zoom lens system according to the second embodiment of the present invention. The lens arrangement of the second embodiment is the same as that of the first embodiment. FIGS. 9A through 9D show aberrations occurred in the lens arrangement shown in FIG. 8, at the short focal length extremity (W). FIG. 10A through 10D show aberrations occurred in the lens arrangement shown in FIG. 8, at an intermediate focal length (fM). FIGS. 11A through 11D show aberrations occurred in the lens arrangement shown in FIG. 8, at the long focal length extremity (T).

Table 2 shows the numerical data of the second embodiment.

The values $F_{NO}$, W, $f_B$, and the d values at surface Nos. 4 and 12 are shown in the order fW, fM and fT.

The diaphragm S is provided 1.00 behind the positive second lens group 20 (surface No. 12).

TABLE 2

$F_{NO} = 1:5.1–7.4–13.0$
$f = 39.00–60.00–136.00$
$W = 28.5–19.4–8.9$
$f_B = 10.26–25.03–68.08$

| Surf. No. | r | d | $N_d$ | $v_d$ |
|---|---|---|---|---|
| 1 | −24.388 | 1.50 | 1.84666 | 23.8 |
| 2 | −32.252 | 0.10 | — | — |

TABLE 2-continued $F_{NO} = 1:5.1–7.4–13.0$
f = 39.00–60.00–136.00
W = 28.5–19.4–8.9
$f_B$ = 10.26–25.03–68.08

| Surf. No. | r | d | $N_d$ | $v_d$ |
|---|---|---|---|---|
| 3 | 42.354 | 3.40 | 1.48749 | 70.2 |
| 4 | −42.354 | 2.38–5.50–16.72 | — | — |
| 5 | −18.643 | 1.50 | 1.88300 | 40.8 |
| 6 | 48.203 | 0.20 | — | — |
| 7 | 22.643 | 1.50 | 1.83400 | 37.2 |
| 8 | 9.000 | 3.87 | 1.68893 | 31.1 |
| 9 | −32.623 | 1.96 | — | — |
| 10 | 37.243 | 1.50 | 1.84666 | 23.8 |
| 11 | 15.608 | 3.47 | 1.66625 | 0.0 |
| 12* | −22.364 | 14.70–9.90–3.25 | — | — |
| 13* | −58.545 | 2.60 | 1.58547 | 29.9 |
| 14 | −25.257 | 3.43 | — | — |
| 15 | −9.989 | 1.50 | 1.69680 | 55.5 |
| 16 | −160.197 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 12 | 0.00 | $0.76811 \times 10^{-5}$ | $-0.28541 \times 10^{-6}$ | — |
| 13 | 0.00 | $0.91234 \times 10^{-4}$ | $-0.12119 \times 10^{-6}$ | $0.80186 \times 10^{-8}$ |

[Embodiment 3]

In the third embodiment, the telephoto-type zoom lens system employs the three-lens-group arrangement, and each lens group of the zoom lens system is arranged to move along the lens-group moving paths of FIG. 1.

FIG. 12 is the lens arrangement of the zoom lens system according to a third embodiment of the present invention. The lens arrangement of the third embodiment is the same as that of the first embodiment. FIGS. 13A through 13D show aberrations occurred in the lens arrangement shown in FIG. 12, at the short focal length extremity (W). FIG. 14A through 14D show aberrations occurred in the lens arrangement shown in FIG. 12, at an intermediate focal length (fM). FIGS. 15A through 15D show aberrations occurred in the lens arrangement shown in FIG. 12, at the long focal length extremity (T).

Table 3 shows the numerical data of the third embodiment.

The values $F_{NO}$, W, $f_B$, and the d values at surface Nos. 4 and 12 are shown in the order fw, fM and fT.

The diaphragm S is provided 1.00 behind the positive second lens group 20 (surface No. 12).

TABLE 3

$F_{NO} = 1:5.1–8.5–13.0$
f = 39.00–70.00–136.00
W = 28.5–16.9–8.9
$f_B$ = 10.24–32.26–68.14

| Surf. No. | r | d | $N_d$ | $v_d$ |
|---|---|---|---|---|
| 1 | −24.470 | 1.50 | 1.84666 | 23.8 |
| 2 | −32.300 | 0.10 | — | — |
| 3 | 42.600 | 3.40 | 1.48749 | 70.2 |
| 4 | −42.600 | 2.34–6.00–16.71 | — | — |

TABLE 3-continued $F_{NO} = 1:5.1–8.5–13.0$
f = 39.00–70.00–136.00
W = 28.5–16.9–8.9
$f_B$ = 10.24–32.26–68.14

| Surf. No. | r | d | $N_d$ | $v_d$ |
|---|---|---|---|---|
| 5 | −19.380 | 1.50 | 1.88300 | 40.8 |
| 6 | 66.339 | 0.53 | — | — |
| 7 | 24.330 | 1.50 | 1.83400 | 37.2 |
| 8 | 9.000 | 3.75 | 1.69865 | 30.1 |
| 9 | −50.460 | 1.63 | — | — |
| 10 | 34.600 | 1.54 | 1.84666 | 23.8 |
| 11 | 14.677 | 3.55 | 1.66625 | 0.0 |
| 12* | −21.443 | 14.74–8.59–3.26 | — | — |
| 13* | −60.407 | 2.60 | 1.58547 | 29.9 |
| 14 | −25.594 | 3.41 | — | — |
| 15 | −10.014 | 1.50 | 1.69680 | 55.5 |
| 16 | −161.880 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 12 | 0.00 | $0.12240 \times 10^{-4}$ | $-0.26469 \times 10^{-6}$ | — |
| 13 | 0.00 | $0.91483 \times 10^{-4}$ | $-0.11147 \times 10^{-6}$ | $0.78421 \times 10^{-8}$ |

[Embodiment 4]

In the fourth embodiment, the telephoto-type zoom lens system employs the four-lens-group arrangement, and each lens group of the zoom lens system is arranged to move along the lens-group moving paths of FIG. 2.

FIG. 16 is the lens arrangement of the zoom lens system according to a fourth embodiment of the present invention. FIGS. 17A through 17D show aberrations occurred in the lens arrangement shown in FIG. 16, at the short focal length extremity (W). FIG. 18A through 18D show aberrations occurred in the lens arrangement shown in FIG. 16, at an intermediate focal length (fM). FIGS. 19A through 19D show aberrations occurred in the lens arrangement shown in FIG. 16, at the long focal length extremity (T).

Table 4 shows the numerical data of the fourth embodiment.

The values $F_{NO}$, W, $f_B$, and the d values at surface Nos. 4, 7 and 12 are shown in the order fw, fM and fT.

The diaphragm S is provided 0.70 behind the positive third lens group 60 (surface No. 12).

The positive first lens group 40 includes a negative meniscus lens element having the concave surface facing toward the object, and a positive lens element, in this order from the object.

The negative second lens group 50 includes cemented lens elements having a negative biconcave lens element and a positive lens element, in this order from the object.

The positive third lens group 60 includes cemented lens elements having a negative meniscus lens element having the convex surface facing toward the object and a positive lens element, and a positive single lens element, in this order from the object.

The negative fourth lens group 70 includes a positive single lens element and a negative single lens element, in this order from the object.

TABLE 4

$F_{NO} = 1:4.8$–$7.7$–$12.0$
$f = 28.50$–$70.00$–$138.00$
$W = 37.1$–$17.2$–$8.8$
$f_B = 8.00$–$38.95$–$65.00$

| Surf. No. | r | d | $N_d$ | $v_d$ |
|---|---|---|---|---|
| 1 | −28.382 | 1.00 | 1.84666 | 23.8 |
| 2 | −51.190 | 0.10 | — | — |
| 3 | 34.000 | 3.00 | 1.60311 | 60.7 |
| 4 | −50.661 | 1.80–9.02–14.70 | — | — |
| 5* | −16.815 | 1.00 | 1.77250 | 49.6 |
| 6 | 10.426 | 2.86 | 1.80518 | 25.4 |
| 7 | 28.589 | 3.10–2.80–0.30 | — | — |
| 8 | 10.888 | 1.00 | 1.80518 | 25.4 |
| 9 | 7.502 | 3.70 | 1.58913 | 61.2 |
| 10* | −108.815 | 0.20 | — | — |
| 11 | 43.460 | 2.40 | 1.51633 | 64.1 |
| 12 | −21.272 | 11.63–3.57–3.48 | — | — |
| 13* | −113.135 | 2.80 | 1.58547 | 29.9 |
| 14* | −23.031 | 3.16 | — | — |
| 15 | −9.678 | 1.30 | 1.72916 | 54.7 |
| 16 | 768.406 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 5 | 0.00 | $0.33220 \times 10^{-4}$ | $0.39879 \times 10^{-6}$ | $-0.35918 \times 10^{-8}$ |
| 10 | 0.00 | $0.16388 \times 10^{-3}$ | $0.10725 \times 10^{-5}$ | $-0.10973 \times 10^{-7}$ |
| 13 | 0.00 | $0.57420 \times 10^{-4}$ | $0.61735 \times 10^{-6}$ | $0.10702 \times 10^{-7}$ |
| 14 | 0.00 | $-0.46592 \times 10^{-4}$ | $0.10334 \times 10^{-5}$ | $0.60275 \times 10^{-8}$ |

[Embodiment 5]

In the fifth embodiment, the telephoto-type zoom lens system employs the four-lens-group arrangement, and each lens group of the zoom lens system is arranged to move along the lens-group moving paths of FIG. 2.

FIG. 20 is the lens arrangement of the zoom lens system according to the fifth embodiment of the present invention. The lens arrangement of the fifth embodiment is the same as that of the fourth embodiment. FIGS. 21A through 21D show aberrations occurred in the lens arrangement shown in FIG. 20, at the short focal length extremity (W). FIG. 22A through 22D show aberrations occurred in the lens arrangement shown in FIG. 20, at an intermediate focal length (fM). FIG. 23A through 23D show aberrations occurred in the lens arrangement shown in FIG. 20, at the long focal length extremity (T).

Table 5 shows the numerical data of the fifth embodiment.

The values $F_{NO}$, W, $f_B$, and the d values at surface Nos. 4, 7 and 12 are shown in the order fw, fM and fT.

The diaphragm S is provided 0.70 behind the positive third lens group 60 (surface No. 12).

TABLE 5

$F_{NO} = 1:5.3$–$7.7$–$12.0$
$f = 28.50$–$70.00$–$138.00$
$W = 36.6$–$17.1$–$8.7$
$f_B = 8.30$–$39.74$–$65.85$

| Surf. No. | r | d | $N_d$ | $v_d$ |
|---|---|---|---|---|
| 1 | −32.696 | 1.10 | 1.84666 | 23.8 |
| 2 | −56.953 | 0.10 | — | — |
| 3 | 36.288 | 2.90 | 1.58913 | 61.2 |
| 4 | −57.074 | 1.80–9.99–15.80 | — | — |
| 5* | −16.922 | 1.00 | 1.80400 | 46.6 |
| 6 | 10.343 | 2.98 | 1.78472 | 25.7 |
| 7 | 40.454 | 3.30–3.00–0.30 | — | — |
| 8 | 10.875 | 1.00 | 1.84666 | 23.8 |
| 9 | 7.647 | 3.70 | 1.58913 | 61.2 |
| 10* | −101.328 | 0.20 | — | — |
| 11 | 51.984 | 2.36 | 1.51633 | 64.1 |
| 12 | −21.403 | 11.75–3.44–3.48 | — | — |
| 13* | −96.239 | 2.71 | 1.60858 | 27.0 |
| 14* | −22.327 | 3.22 | — | — |
| 15 | −9.690 | 1.30 | 1.72916 | 54.7 |
| 16 | 8650.450 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 5 | 0.00 | $0.33464 \times 10^{-4}$ | $0.42469 \times 10^{-6}$ | $-0.50410 \times 10^{-8}$ |
| 10 | 0.00 | $0.15477 \times 10^{-3}$ | $0.98126 \times 10^{-6}$ | $-0.10973 \times 10^{-7}$ |
| 13 | 0.00 | $0.62569 \times 10^{-4}$ | $0.97610 \times 10^{-6}$ | $0.81060 \times 10^{-8}$ |
| 14 | 0.00 | $-0.19172 \times 10^{-4}$ | $0.12386 \times 10^{-5}$ | $0.60275 \times 10^{-8}$ |

[Embodiment 6]

In the sixth embodiment, the zoom lens system employs the four-lens-group arrangement, and each lens group of the zoom lens system is arranged to move along the lens-group moving paths of FIG. 3.

FIG. 24 is the lens arrangement of the zoom lens system according to the sixth embodiment of the present invention. FIGS. 25A through 25D show aberrations occurred in the lens arrangement shown in FIG. 24, at the short focal length extremity (W). FIG. 26A through 26D show aberrations occurred in the lens arrangement shown in FIG. 24, at the fist intermediate focal length (fm1; before switching). FIG. 27A through 27D show aberrations occurred in the lens arrangement shown in FIG. 24, at the second intermediate focal length (fm2; after switching). FIGS. 28A through 28D show aberrations occurred in the lens arrangement shown in FIG. 24, at the long focal length extremity (T).

Table 6 shows the numerical data of the sixth embodiment.

The values $F_{NO}$, W, $f_B$, and the d values at surface Nos. 4, 7 and 12 are shown in the order fw, fm1, fm2 and fT.

The diaphragm S is provided 0.70 behind the positive third lens group 100 (surface No. 12).

The positive first lens group 80 includes a negative meniscus lens element having the concave surface facing toward the object, and a positive lens element, in this order from the object.

The negative second lens group 90 includes cemented lens elements having a negative biconcave lens element and a positive lens element, in this order from the object.

The positive third lens group 100 includes cemented lens elements having a negative meniscus lens element having the convex surface facing toward the object and a positive lens element, and a positive single lens element, in this order from the object.

The negative fourth lens group 110 includes a positive single lens element and a negative single lens element, in this order from the object.

The negative second lens group 90 and the positive third lens group 30 maintains the first distance (d1=3.60) in the first focal-length range ZW, and maintain the second distance (d2=0.30) in the second focal-length range ZT.

TABLE 6

$F_{NO}$ = 1:5.3–9.6–9.8–12.5
f = 28.50–70.00–90.00–138.00
W = 36.5–17.2–12.9–8.7
$f_B$ = 8.30–43.01–37.46–67.82

| Surf. No. | r | d | $N_d$ | $v_d$ |
|---|---|---|---|---|
| 1 | −32.378 | 1.20 | 1.84666 | 23.8 |
| 2 | −58.898 | 0.10 | — | — |
| 3 | 40.369 | 2.80 | 1.61800 | 63.4 |
| 4 | −53.821 | 1.88–9.44–15.10–15.59 | — | — |
| 5* | −17.750 | 1.20 | 1.80400 | 46.6 |
| 6 | 10.593 | 2.99 | 1.78472 | 25.7 |
| 7 | 42.692 | 3.60–3.60–0.30–0.30 | — | — |
| 8 | 10.938 | 1.20 | 1.84666 | 23.8 |
| 9 | 7.588 | 3.80 | 1.60970 | 57.8 |
| 10* | −246.158 | 0.20 | — | — |
| 11 | 55.976 | 2.27 | 1.51633 | 64.1 |
| 12 | −22.315 | 12.06–2.85–6.21–3.48 | — | — |
| 13* | −72.551 | 2.60 | 1.68893 | 31.1 |
| 14* | −21.066 | 3.05 | — | — |
| 15 | −9.828 | 1.40 | 1.72916 | 54.7 |
| 16 | 477.075 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 5 | 0.00 | $0.30189 \times 10^{-4}$ | $0.36711 \times 10^{-6}$ | $-0.42456 \times 10^{-8}$ |
| 10 | 0.00 | $0.15502 \times 10^{-3}$ | $0.10025 \times 10^{-5}$ | $-0.10973 \times 10^{-7}$ |
| 13 | 0.00 | $0.51569 \times 10^{-4}$ | $0.94227 \times 10^{-6}$ | $0.76974 \times 10^{-8}$ |
| 14 | 0.00 | $-0.19688 \times 10^{-4}$ | $0.11413 \times 10^{-5}$ | $0.60275 \times 10^{-8}$ |

The numerical values of each embodiment for each condition are shown in Table 7.

TABLE 7

| | Embod. 1 | Embod. 2 | Embod. 3 | Embod. 4 | Embod. 5 | Embod. 6 |
|---|---|---|---|---|---|---|
| Cond. (1) | 1.28 | 1.54 | 1.79 | 1.85 | 1.75 | 1.82 |
| Cond. (2) | 0.64 | 0.48 | 0.71 | 0.52 | 0.67 | 0.74 |
| Cond. (3) | 2.88 | 2.89 | 2.90 | 1.94 | 2.73 | 1.82 |
| Cond. (4) | 0.83 | 0.83 | 0.83 | 0.40 | 0.56 | 0.38 |
| Cond. (5) | 3.49 | 3.49 | 3.49 | 4.84 | 4.84 | 4.84 |
| Cond. (6) | — | — | — | 1.85 | 1.75 | 1.82 |
| Cond. (7) | — | — | — | 0.40 | 0.56 | 0.38 |
| Cond. (8) | — | — | — | 0.58 | 0.62 | 0.68 |
| Cond. (9) | — | — | — | −10.15 | −9.79 | −9.32 |
| Cond. (10) | — | — | — | 1.14 | 1.16 | 1.15 |
| Cond. (11) | — | — | — | 4.84 | 4.84 | 4.84 |
| Cond. (12) | — | — | — | 4.34 | 4.54 | 4.17 |
| Cond. (13) | — | — | — | −34.43 | −34.19 | −34.38 |
| Cond. (14) | 0.51 | 0.50 | 0.50 | 0.31 | 0.24 | 0.26 |

As can be understood from Table 7, the numerical values of the first through sixth embodiments satisfy conditions (1) through (14). Furthermore, as shown in the aberration diagrams, the various aberrations can be adequately corrected at each focal length.

According to the above description, miniaturization in the radial direction and a higher zoom ratio can be attained in a telephoto-type zoom lens system which is constituted by three lens groups or more, and has a positive lens group at the most object-side of the zoom lens system.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens system comprising 'n' (n≧3) lens groups, wherein a first lens group that is the most object-side lens group of said zoom lens system has a positive refractive power, and a final lens group that is the most image-side lens group of said zoom lens system has a negative refractive power;

wherein the distance from the most object-side surface of said positive first lens group to the most image-side surface of said negative final lens group becomes shortest at an intermediate focal length between the short focal length extremity and the long focal length extremity; and wherein the zoom lens system satisfies the following condition:

$$1.0 < f_M/f_W < 3.0$$

wherein $f_M$ designates an intermediate focal length of said zoom lens system at which the distance from the most object-side surface of said positive first lens group to the most image-side surface of said negative final lens group becomes shortest; and $f_W$ designates the focal length of said zoom lens system at the short focal length extremity.

2. The zoom lens system according to claim 1, satisfying the following condition:

$$0.3 < (LD_W - LD_M)/(f_T/f_W) < 1.0$$

wherein $LD_W$ designates the distance from the most object-side surface of said positive first lens group to the most image-side surface of said negative final lens group, at the short focal length extremity;

$LD_M$ designates the distance from the most object-side surface of said positive first lens group to the most image-side surface of said negative final lens group, at the intermediate focal length $f_M$; and $f_T$ designates the focal length of said zoom lens system at the long focal length extremity.

3. The zoom lens system according to claim 1, satisfying the following condition:

$$0 < LD_T - LD_W$$

wherein $LD_T$ designates the distance from the most object-side surface of said positive first lens group to the most image-side surface of said negative final lens group, at the long focal length extremity; and $LD_W$ designates the distance from the most object-side surface of said positive first lens group to the most image-side surface of said negative final lens group, at the short focal length extremity.

4. The zoom lens system according to claim 1, satisfying the following condition:

$$0.3 < (LD_T - LD_W)/(f_T/f_W) < 0.9$$

wherein $LD_T$ designates the distance from the most object-side surface of said positive first lens group to the most image-side surface of said negative final lens group, at the long focal length extremity;

$LD_W$ designates the distance from the most object-side surface of the positive first lens group to the most image-side surface of the negative final lens group, at the short focal length extremity; and $f_T$ designates the focal length of said zoom lens system at the long focal length extremity.

5. The zoom lens system according to claim 1, satisfying the following condition:

$$3 < f_T/f_W$$

wherein $f_T$ designates the focal length of said zoom lens system at the long focal length extremity.

6. The zoom lens system according to claim 1, wherein said zoom lens system comprises three lens groups (n=3); and wherein said three lens groups comprise said positive first lens group, a positive second lens group, and said negative final lens group, in this order from an object.

7. The zoom lens system according to claim 1, wherein said zoom lens system comprises four lens groups (n=4); and wherein said four lens groups comprise said positive first lens group, a negative second lens group, a positive third lens group, and said negative final lens group, in this order from an object.

8. The zoom lens system according to claim 7, satisfying the following condition:

$$1.2 < f_M/f_W < 3.0.$$

9. The zoom lens system according to claim 7, satisfying the following condition:

$$0.3 < (LD_T - LD_W)/(f_T/f_W) < 0.7$$

wherein $LD_T$ designates the distance from the most object-side surface of said positive first lens group to the most image-side surface of said negative fourth lens group, at the long focal length extremity;

$LD_W$ designates the distance from the most object-side surface of said positive first lens group to the most image-side surface of said negative fourth lens group, at the short focal length extremity; and $f_T$ designates the focal length of said zoom lens system at the long focal length extremity.

10. The zoom lens system according to claim 7, satisfying the following condition:

$$0.3 < (d_{23W} - d_{23T})/(f_T/f_W) < 1.5$$

wherein $d_{23W}$ designates the axial distance between said negative second lens group and said positive third lens group at the short focal length extremity;

$d_{23T}$ designates the axial distance between said negative second lens group and said positive third lens group at the long focal length extremity; and $f_T$ designates the focal length of said zoom lens system at the long focal length extremity.

11. The zoom lens system according to claim 7, satisfying the following condition:

$$-12 < f_T/f_{2G} < -9$$

wherein $f_T$ designates the focal length of said zoom lens system at the long focal length extremity; and $f_{2G}$ designates the focal length of said negative second lens group.

12. The zoom lens system according to claim 7, satisfying the following condition:

$$1.05 < h_{3G}/h1 < 1.30$$

wherein $h_{3G}$ designates the height of a paraxial light ray incident on the final surface of said positive third lens group; and h1 designates the height of a paraxial light ray incident on the first surface of said positive first lens group.

13. The zoom lens system according to claim 7, satisfying the following condition:

$$4.5 < f_T/f_W$$

wherein $f_T$ designates the focal length of said zoom lens system at the long focal length extremity.

14. A zoom lens system comprising 'n' (n≧3) lens groups, wherein a first lens group that is the most object-side lens group of said zoom lens system has a positive refractive power, and a final lens group that is the most image-side lens group of said zoom lens system has a negative refractive power;

wherein the distance from the most object-side surface of said positive first lens group to the most image-side surface of said negative final lens group becomes shortest at an intermediate focal length between the short focal length extremity and the long focal length extremity; and wherein the zoom lens system satisfies the following condition:

$$0.3 < (LD_W - LD_M)/(f_T/f_W) < 1.0$$

wherein $LD_W$ designates the distance from the most object-side surface of said positive first lens group to the most image-side surface of said negative final lens group, at the short focal length extremity;

$LD_M$ designates the distance from the most object-side surface of said positive first lens group to the most image-side surface of said negative final lens group, at the intermediate focal length $f_M$;

$f_T$ designates the focal length of said zoom lens system at the long focal length extremity; and $f_W$ designates the focal length of said zoom lens system at the short focal length extremity.

15. The zoom lens system according to claim 14, satisfying the following condition:

$$0 < LD_T - LD_W$$

wherein $LD_T$ designates the distance from the most object-side surface of said positive first lens group to the most image-side surface of said negative final lens group, at the long focal length extremity.

16. The zoom lens system according to claim 14, satisfying the following condition:

$$0.3<(LD_T-LD_W)/(f_T/f_W)<0.9$$

wherein $LD_T$ designates the distance from the most object-side surface of said positive first lens group to the most image-side surface of said negative final lens group, at the long focal length extremity.

17. The zoom lens system according to claim 14, satisfying the following condition:

$$3<f_T/f_W.$$

18. The zoom lens system according to claim 14, wherein said zoom lens system comprises three lens groups (n=3); and wherein said three lens groups comprise said positive first lens group, a positive second lens group, and said negative final lens group, in this order from an object.

19. The zoom lens system according to claim 14, wherein said zoom lens system comprises four lens groups (n=4); and wherein said four lens groups comprise said positive first lens group, a negative second lens group, a positive third lens group, and said negative final lens group, in this order from an object.

20. A zoom lens system comprising 'n' (n≧3) lens groups, wherein a first lens group that is the most object-side lens group of said zoom lens system has a positive refractive power, and a final lens group that is the most image-side lens group of said zoom lens system has a negative refractive power;

wherein the distance from the most object-side surface of said positive first lens group to the most image-side surface of said negative final lens group becomes shortest at an intermediate focal length between the short focal length extremity and the long focal length extremity; and wherein the zoom lens system satisfies the following condition:

$$0<LD_T-LD_W$$

wherein $LD_T$ designates the distance from the most object-side surface of said positive first lens group to the most image-side surface of said negative final lens group, at the long focal length extremity; and $LD_W$ designates the distance from the most object-side surface of said positive first lens group to the most image-side surface of said negative final lens group, at the short focal length extremity.

21. The zoom lens system according to claim 20, satisfying the following condition:

$$0.3<(LD_T-LD_W)/(f_T/f_W)<0.9$$

wherein $f_T$ designates the focal length of said zoom lens system at the long focal length extremity; and $f_W$ designates the focal length of said zoom lens system at the short focal length extremity.

22. The zoom lens system according to claim 20, satisfying the following condition:

$$3<f_T/f_W$$

wherein $f_T$ designates the focal length of said zoom lens system at the long focal length extremity; and $f_W$ designates the focal length of said zoom lens system at the short focal length extremity.

23. The zoom lens system according to claim 20, wherein said zoom lens system comprises three lens groups (n=3); and wherein said three lens groups comprise said positive first lens group, a positive second lens group, and said negative final lens group, in this order from an object.

24. The zoom lens system according to claim 20, wherein said zoom lens system comprises four lens groups (n=4); and wherein said four lens groups comprise said positive first lens group, a negative second lens group, a positive third lens group, and said negative final lens group, in this order from an object.

25. A zoom lens system comprising 'n' (n≧3) lens groups, wherein a first lens group that is the most object-side lens group of said zoom lens system has a positive refractive power, and a final lens group that is the most image-side lens group of said zoom lens system has a negative refractive power;

wherein the distance from the most object-side surface of said positive first lens group to the most image-side surface of said negative final lens group becomes shortest at an intermediate focal length between the short focal length extremity and the long focal length extremity; and wherein the zoom lens system satisfies the following condition:

$$0.3<(LD_T-LD_W)/(f_T/f_W)<0.9$$

wherein $LD_T$ designates the distance from the most object-side surface of said positive first lens group to the most image-side surface of said negative final lens group, at the long focal length extremity;

$LD_W$ designates the distance from the most object-side surface of the positive first lens group to the most image-side surface of the negative final lens group, at the short focal length extremity;

$f_T$ designates the focal length of said zoom lens system at the long focal length extremity; and $f_W$ designates the focal length of said zoom lens system at the short focal length extremity.

26. The zoom lens system according to claim 25, satisfying the following condition:

$$3<f_T/f_W.$$

27. The zoom lens system according to claim 25, wherein said zoom lens system comprises three lens groups (n=3); and wherein said three lens groups comprise said positive first lens group, a positive second lens group, and said negative final lens group, in this order from an object.

28. The zoom lens system according to claim 25, wherein said zoom lens system comprises four lens groups (n=4); and wherein said four lens groups comprise said positive first lens group, a negative second lens group, a positive third lens group, and said negative final lens group, in this order from an object.

29. A zoom lens system comprising 'n' (n≧3) lens groups, wherein a first lens group that is the most object-side lens group of said zoom lens system has a positive refractive power, and a final lens group that is the most image-side lens group of said zoom lens system has a negative refractive power;

wherein the distance from the most object-side surface of said positive first lens group to the most image-side surface of said negative final lens group becomes shortest at an intermediate focal length between the short focal length extremity and the long focal length extremity;

wherein said zoom lens system comprises three lens groups (n=3); and wherein said three lens groups comprise said positive first lens group, a positive second lens group, and said negative final lens group, in this order from an object.

30. The zoom lens system according to claim 29, satisfying the following condition:

$$3 < f_T/f_W$$

wherein $f_T$ designates the focal length of said zoom lens system at the long focal length extremity; and $f_W$ designates the focal length of said zoom lens system at the short focal length extremity.

* * * * *